(12) United States Patent
McRae et al.

(10) Patent No.: US 8,873,239 B2
(45) Date of Patent: Oct. 28, 2014

(54) ELECTRONIC MODULE, CONTROL MODULE, AND ELECTRONIC MODULE SET

(75) Inventors: Jordan Jerome McRae, Paris (FR); Shawn Michael Frayne, Hong Kong (CN)

(73) Assignee: Octo23 Technologies LLC, Seattle, WA (US)

( * ) Notice: Subject to any disclaimer, the term of this patent is extended or adjusted under 35 U.S.C. 154(b) by 396 days.

(21) Appl. No.: 13/407,413

(22) Filed: Feb. 28, 2012

(65) Prior Publication Data

US 2012/0218211 A1    Aug. 30, 2012

Related U.S. Application Data

(60) Provisional application No. 61/447,670, filed on Feb. 28, 2011.

(51) Int. Cl.
H05K 7/00 (2006.01)
(52) U.S. Cl.
USPC .......................................................... 361/728
(58) Field of Classification Search
CPC ....................................................... H05K 7/00
USPC .......................................................... 361/728
See application file for complete search history.

(56) References Cited

U.S. PATENT DOCUMENTS

| 2,947,914 | A | 8/1960 | Simons |
|---|---|---|---|
| 4,546,267 | A | 10/1985 | Urfirer |
| 5,663,938 | A | 9/1997 | Dang et al. |
| 5,799,067 | A | 8/1998 | Kikinis et al. |
| 6,024,626 | A | 2/2000 | Mendelsohn |
| 6,469,901 | B1 | 10/2002 | Costner |
| 6,629,771 | B2 | 10/2003 | Chiu |
| 6,850,426 | B2 | 2/2005 | Kojori et al. |
| 7,331,793 | B2 | 2/2008 | Hernandez et al. |
| 7,333,328 | B2 * | 2/2008 | Funawatari et al. ..... 361/679.33 |
| 7,358,929 | B2 | 4/2008 | Mueller et al. |
| 7,507,136 | B2 | 3/2009 | Patton |
| 7,511,454 | B1 | 3/2009 | Legg |
| 7,819,114 | B2 | 10/2010 | Augenbraun et al. |
| 7,828,556 | B2 | 11/2010 | Rodrigues |

(Continued)

OTHER PUBLICATIONS

Gilpin et al. Miche: Modular Shape Formation by Self-Disassembly. The International Journal of Robotics Research. Mar. 2008. vol. 27, Nos. 3-4.

(Continued)

Primary Examiner — Forrest M Phillips
(74) Attorney, Agent, or Firm — Jeffrey Schox; Peter Miller

(57) ABSTRACT

One variation of the invention is a electronic module comprising: a housing with external faces and electrically-conductive first, second, and third toes, each of which extends from one face to an adjacent face; first, second, and third magnetic elements arranged within the housing and proximal the first, second, and third toes, respectively; and a circuit arranged within the housing and electrically coupled to the toes. The circuit is operable between: a first mode when the first and second toes are in contact with a first terminal and a second terminal of a second electronic module, respectively; and a second mode when the second and the third toes are in contact with the second terminal and a third terminal of the second electronic module. The magnetic elements are configured to transiently retain the second electronic module against the housing, in both stacked and adjacent configurations, in the first and second modes.

12 Claims, 12 Drawing Sheets

(56) References Cited

U.S. PATENT DOCUMENTS

| | | | |
|---|---|---|---|
| D635,190 S | 3/2011 | Merrill et al. | |
| 7,952,322 B2 | 5/2011 | Partovi et al. | |
| 8,016,636 B2 | 9/2011 | Park | |
| 8,087,939 B2 | 1/2012 | Rohrbach et al. | |
| 8,243,438 B2* | 8/2012 | Wang et al. | 361/679.55 |
| 2003/0021455 A1 | 1/2003 | Dixon et al. | |
| 2008/0232061 A1* | 9/2008 | Wang et al. | 361/686 |
| 2008/0259551 A1 | 10/2008 | Gavenda et al. | |
| 2009/0034169 A1* | 2/2009 | Richardson et al. | 361/679.01 |
| 2009/0214051 A1 | 8/2009 | Lockett et al. | |
| 2009/0297136 A1 | 12/2009 | Lin | |
| 2010/0033127 A1 | 2/2010 | Griffin, Jr. et al. | |
| 2010/0087119 A1 | 4/2010 | Vicentelli | |
| 2010/0197148 A1 | 8/2010 | Rudisill et al. | |
| 2010/0214747 A1 | 8/2010 | Jacobs et al. | |
| 2011/0097996 A1 | 4/2011 | Kalanithi et al. | |
| 2011/0215998 A1 | 9/2011 | Fitzgerald et al. | |
| 2011/0292618 A1* | 12/2011 | Naukkarinen et al. | 361/729 |
| 2012/0069502 A1* | 3/2012 | Lauder et al. | 361/679.01 |
| 2013/0016483 A1* | 1/2013 | Chuang et al. | 361/728 |
| 2013/0301224 A1* | 11/2013 | Chu | 361/728 |

OTHER PUBLICATIONS

Stoy et al. Modular Robotics: The State of the Art. Proceedings of the IEEE 2010 International Conference on Robotics and Automation Workshop. May 3, 2010.

* cited by examiner

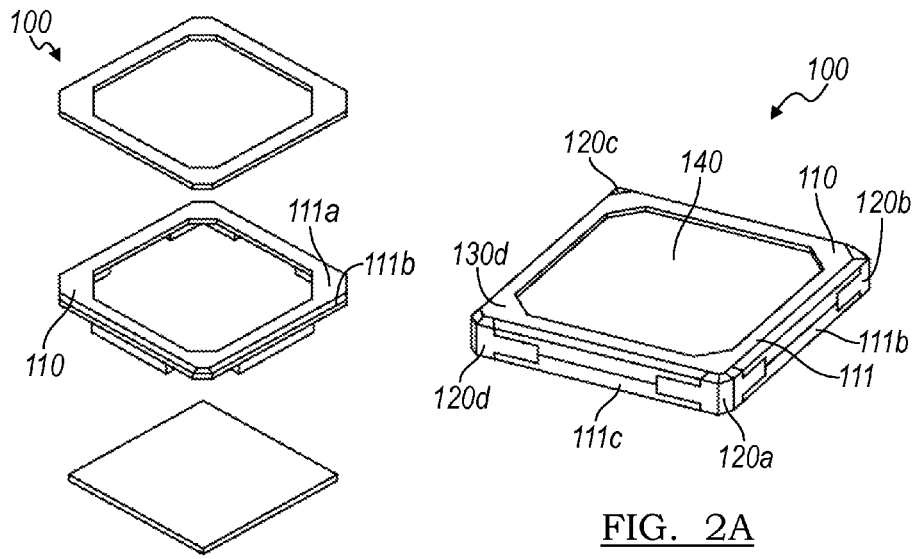
FIG. 2A
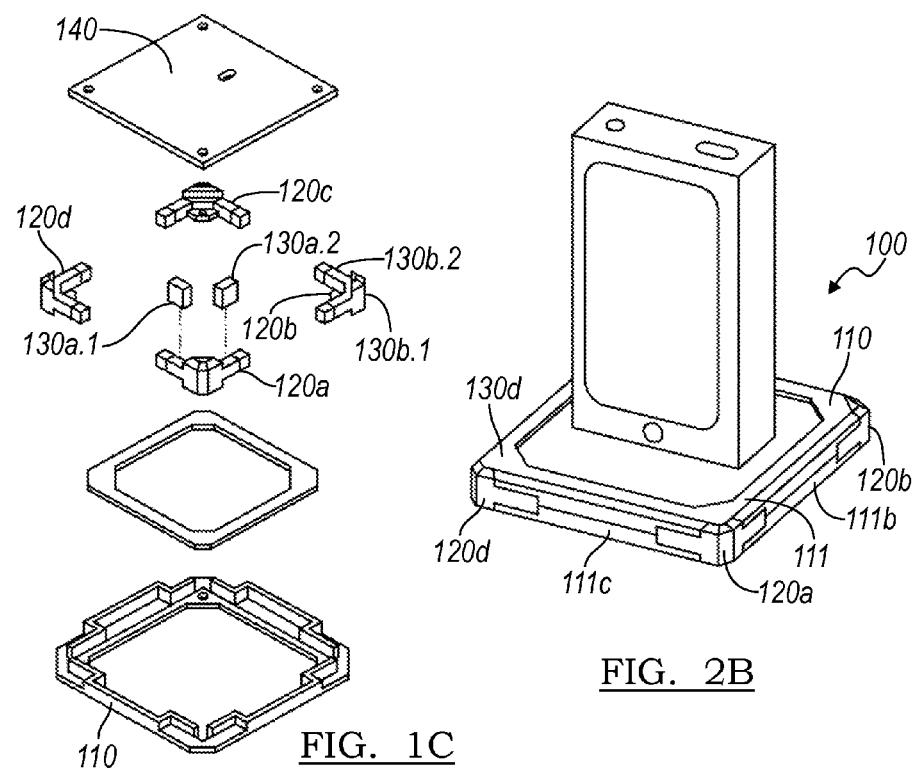
FIG. 1C
FIG. 2B

ELECTRONIC MODULE, CONTROL MODULE, AND ELECTRONIC MODULE SET

CROSS-REFERENCE TO RELATED APPLICATIONS

This application claims the benefit of U.S. Provisional Application No. 61/447,670, filed 28 Feb. 2011, which is incorporated in its entirety by this reference.

TECHNICAL FIELD

This invention relates generally to the electronics field, and more specifically to a new and useful electronic module, control module, and electronic module set in the electronics field.

BACKGROUND

For decades, LEGO, K'NEX, Lincoln Logs, Tinker Toys, and Erector Set have provided convenient mechanisms by which user may prototype and construct almost endless varieties of mechanical structures in almost endless configurations. These mechanical building sets have proved incredibly popular for amateur engineers of all ages and have even been incorporated in high education and professional engineering and design settings to great success as a result of the modularity, cost, convenience, and seemingly endless possibilities that these kits and systems provide. On a larger scale, 80/20 Inc. has provided an industrial-grade variation of the Erector Set; 80/20 components have been incorporated in a vast array of environments for anywhere from prototype manufacturing systems to mass-production testing equipment. However, these predominantly mechanical systems have failed to cover a need in the electronics field for a convenient and modular construction set for electronic systems. Thus, there is a need in the electronics field to create a new and useful electronic module, control module, and electronic module set.

BRIEF DESCRIPTION OF THE FIGURES

FIGS. 1B and 1C are elevation and exploded views, respectfully, of the electronic module of the preferred embodiments;

FIG. 2 is an isometric view of variations of the electronic module of the preferred embodiments;

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1A:
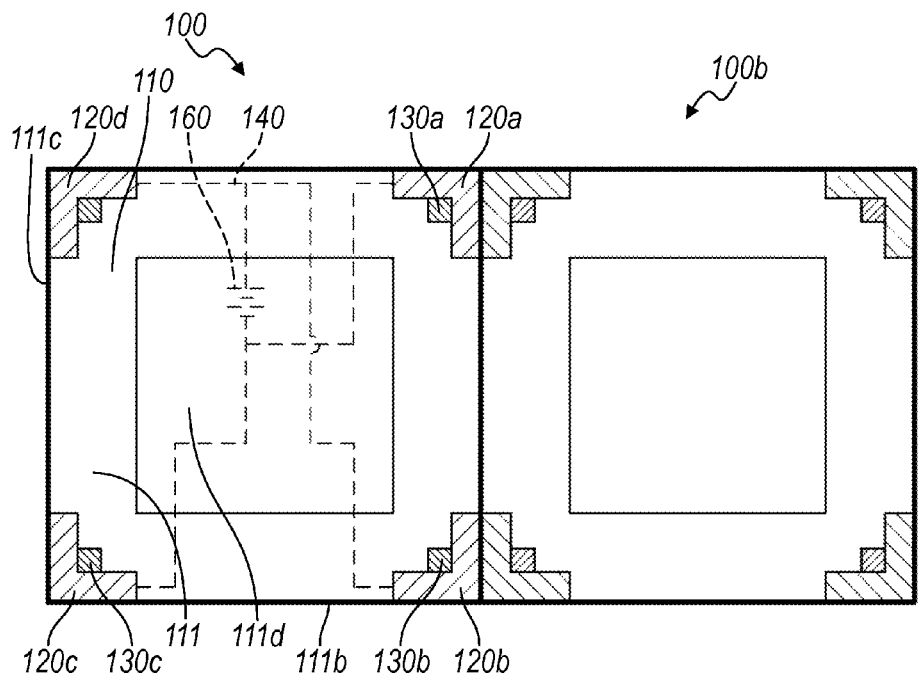
FIG. 1A is a plan view of a electronic module of a first, second, and third preferred embodiment of the invention.
Figure 1B:
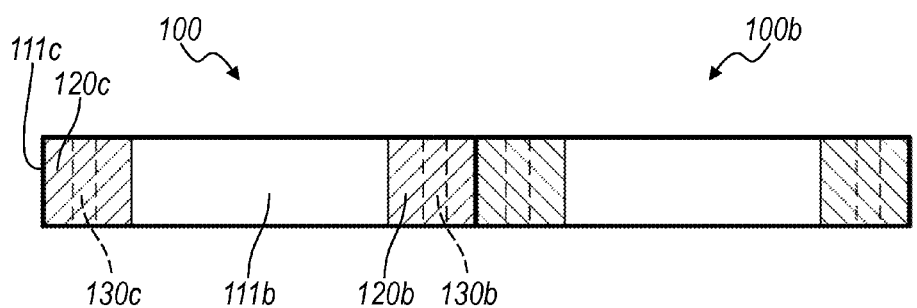

1. The Preferred Embodiments:

As shown in FIGS. 1A, 1B, and 1C, the electronic module 100 of the first preferred embodiment includes: a housing 110 comprising a plurality of external faces 111 and a first electrically-conductive toe 120a, a second electrically-conductive toe 120b, and a third electrically-conductive toe 120c, each toe 120 extending from a face 111a to an adjacent face 111b; a first magnetic element 130a arranged within the housing 110 and proximal the first toe 120a; a second magnetic element 130b arranged within the housing 110 and proximal the second toe 120b; a third magnetic element 130c arranged within the housing 110 and proximal the third toe 120c; and a circuit 140 arranged within the housing 110, electrically coupled to the first, second, and third toes 120, and operable between a first mode and a second mode. The circuit 140 operates in the first mode when the first toe 120a is in contact with a first toe of a second electronic module 100b and the second toe 120b is in contact with a second toe of the second electronic module 100b. The circuit 140 operates in the second mode when the second toe 120b is in contact with the second terminal of the second electronic module 100b and the third toe 120c is in contact with a third terminal of the second electronic module 100b. The magnetic elements 130 are configured to transiently retain the second electronic module 100b against the housing 110, in both stacked (FIG. 7B) and adjacent configurations (FIG. 9), in the first and second modes. The magnetic elements 130 are also configured to repel contact between the first toe 120a and the second terminal of the second electronic module 100b and between the second toe 120b and the first terminal of the second electronic module 100b.

The arrangement of the toes 120 and magnetic elements 130 enable "hermaphroditic magnetic connections" between multiple electronic modules, wherein toes of the electronic module 100 may couple, in a given plane, with any toes of a second electronic module 100b without repulsion. The configuration of the toes 120 and magnetic element 130 may also enable out-of-plane coupling between any toes of the electronic modules. However, when the electronic module 100 is improperly oriented relative to the second electronic module 100b (e.g., upside down), the arrangement of the magnetic elements 130, in both electronic modules 100, 100b, may repel contact between certain toes 120 thereof.

The electronic module 100 may comprise any suitable type of module, such: as a power module; a control (processor) module; a wireless communication module; a human interface module; a solderless plugboard (breadboard) module; a display module; a sensor module; a smartphone interface module; a data storage module; an electromechanical actuator module; or any other suitable type of module.

Figure 6:
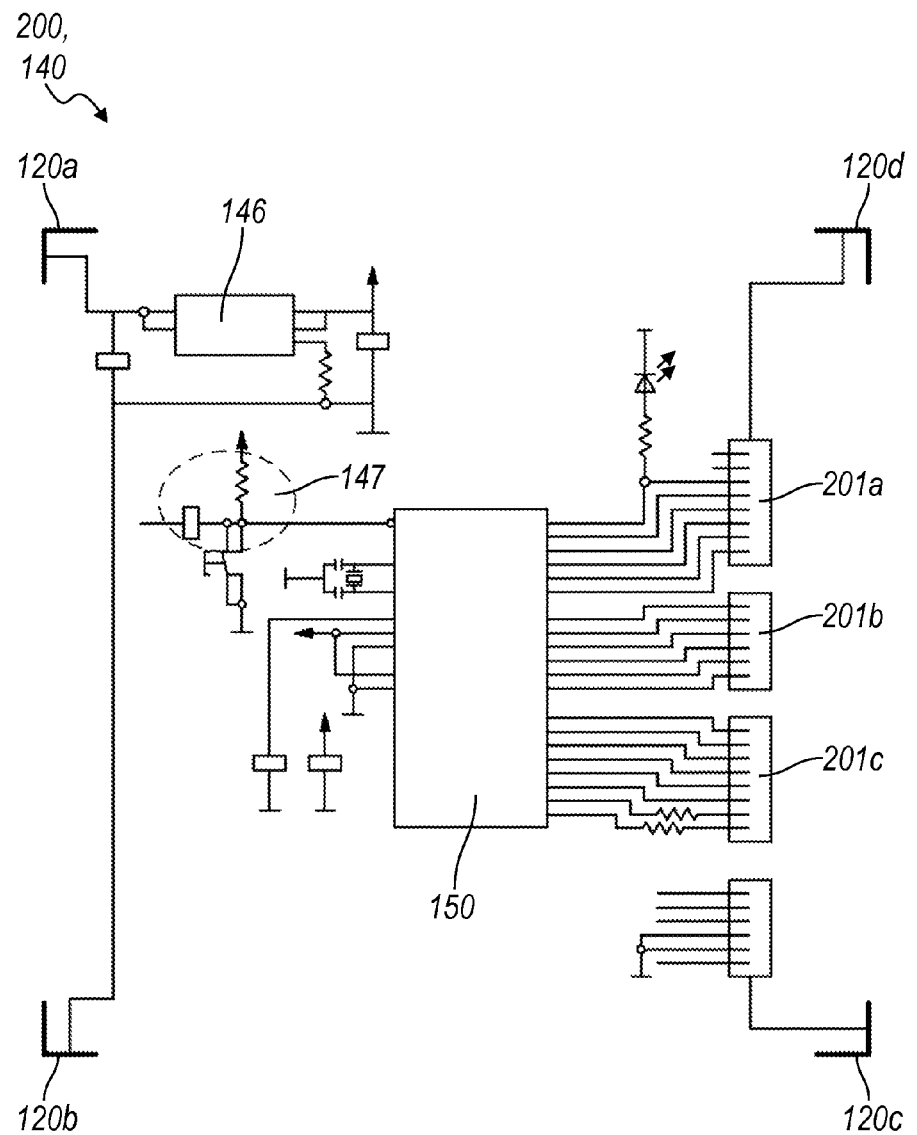
FIG. 6 is a circuit schematic of the second and third preferred embodiment.

As shown in FIG. 6, the control module 200 for an electronic module, of the second preferred embodiment, includes: a housing 110 comprising a plurality of external faces 111 and a first electrically-conductive toe 120a, a second electrically-conductive toe 120b, and a third electrically-conductive toe 120c, each toe 120 extending from a face 111a to an adjacent face 111b; a first magnetic element 130a arranged within the housing 110 and proximal the first toe 120a; a second magnetic element 130b arranged within the housing 110 and proximal the second toe 120b; a third magnetic element 130c arranged within the housing 110 and proximal the third toe 120c; and a processor 150 electrically coupled to the first toe 120a and configured to receive an input thereby, electrically coupled to the second toe 120b and configured to receive a power signal thereby, and electrically coupled to the third toe 120c and configured to transmit an output thereby. The magnetic elements 130 are configured to transiently retain an electronic module against the housing 110, in both stacked and adjacent configurations, with the first toe 120a in contact with a first terminal of the electronic module and with the second toe 120b in contact with a second terminal of the electronic module. The magnetic elements 130 are also configured to repel contact between the first toe 120a and the second terminal of the electronic module and between the second toe 120b and the first terminal of the electronic module. The electronic module 100 of the first preferred embodiment preferably interfaces with the control module 200 of the second preferred embodiment, such as through contact of the first and second toes of the former with the first and second toes of the latter in a stacked (FIG. 7B), an adjacent (FIG. 9), or a perpendicular (FIG. 7A) orientation. Alternatively, the control module 200 may be a variation of the electronic module 100 of the first preferred embodiment.

Figure 7A:
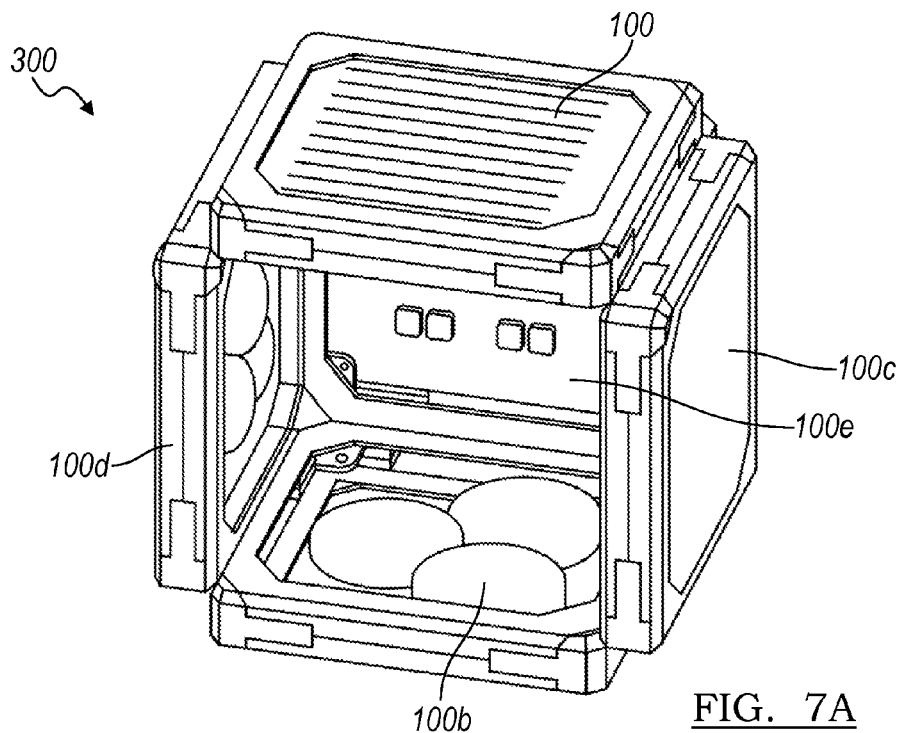
FIG. 7A is an isometric view of a plurality of electronic modules coupled in perpendicular orientations.
Figure 7B:
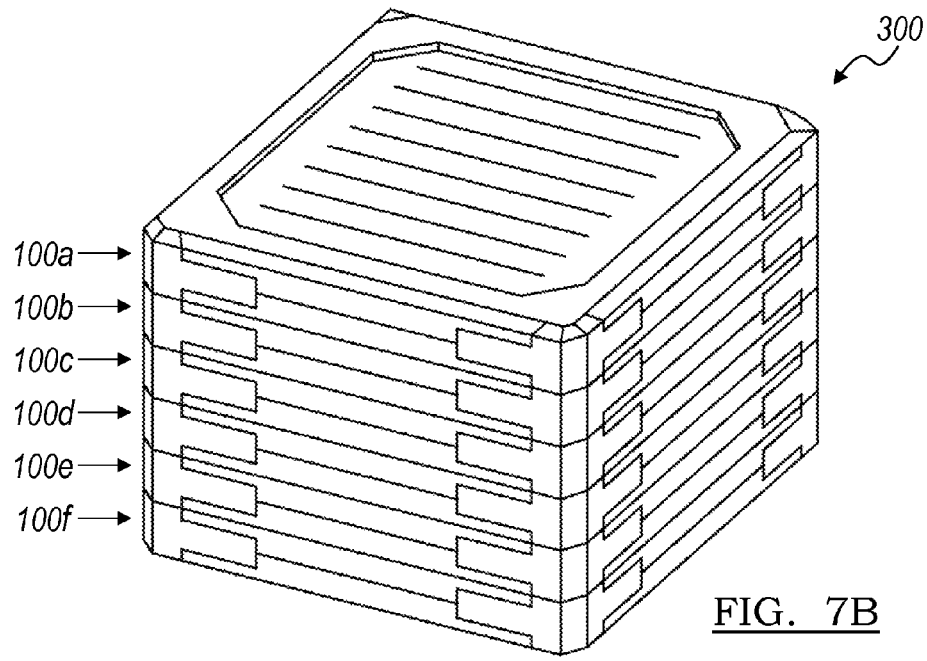
FIG. 7B is an isometric view of a plurality of stacked electronic modules.

As shown in FIG. 7A, the electronic module set 300 of the third preferred embodiment includes a plurality of electronic modules, including a first electronic module 100 and a second electronic module 100b, wherein each electronic module comprises: a housing 110 including a plurality of external faces 111 and a first electrically-conductive toe 120a, a second electrically-conductive toe 120b, and a third electrically-conductive toe 120c, each toe 120 extending from a face to an adjacent face nib; a first magnetic element 130a arranged within the housing 110 and proximal the first toe 120a; a second magnetic element 130b arranged within the housing 110 and proximal the second toe 120b; and a third magnetic element 130c arranged within the housing 110 and proximal the third toe 120c. The first electronic module 100 is further configured to accept a power source 160 and further comprises a circuit 140a configured to electrically couple the first and third toes 120, 120c to a first terminal of the power source 160 and to electrically couple the second toe 120b to a second terminal of the power source 160. The second electronic module 100b further comprises a circuit 140 electrically coupled to the first, second, and third toes thereof, and is configured to receive power from the first electronic module 100a when at least two toes of the second electronic module 100b are in contact with at least two toes of the first electronic module 100a. The magnetic elements 130 are configured to transiently retain the first electronic module 100 against the second electronic module 100b, in both stacked (FIG. 7B) and adjacent (FIG. 9) configurations, in the first and second modes. The magnetic elements 130 of the first electronic module 100 are also configured to repel contact between the first toe 120a of the first electronic module 100 and the second toe of the second electronic module 100b and between the second toe 120b of the first electronic module 100 and the first toe of the second electronic module 100b. The first electronic module 100 is preferably a power module configured to supply a power signal through a set of toes 120 thereof. The power module is preferably configured to accept a power source 160 that is a battery or a photovoltaic cell, though the power module may also include a plug for a wall outlet, a fuel cell, or any other suitable power source, energy collector, or power generator. The second electronic module 100b may comprise the control module 200 of the second preferred embodiment, though the second electronic module 100b may be any other suitable type of electronic module, such as any of the electronic modules 100 of the first preferred embodiment. Unless explicitly noted, a 'electronic module 100' will henceforth define a generic term for any of the electronic module 100 of the first preferred embodiment, the control module 200 of the second preferred embodiment, and the first, second, and/or additional electronic modules 100, 100b of the third preferred embodiment.

Figure 3A:
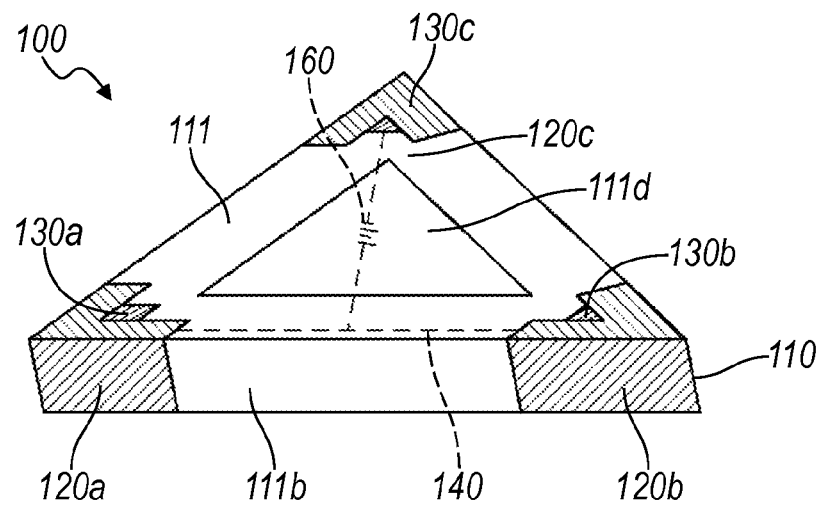
FIGS. 3A and 3B are form variations of the electronic module of the preferred embodiments.
Figure 3B:
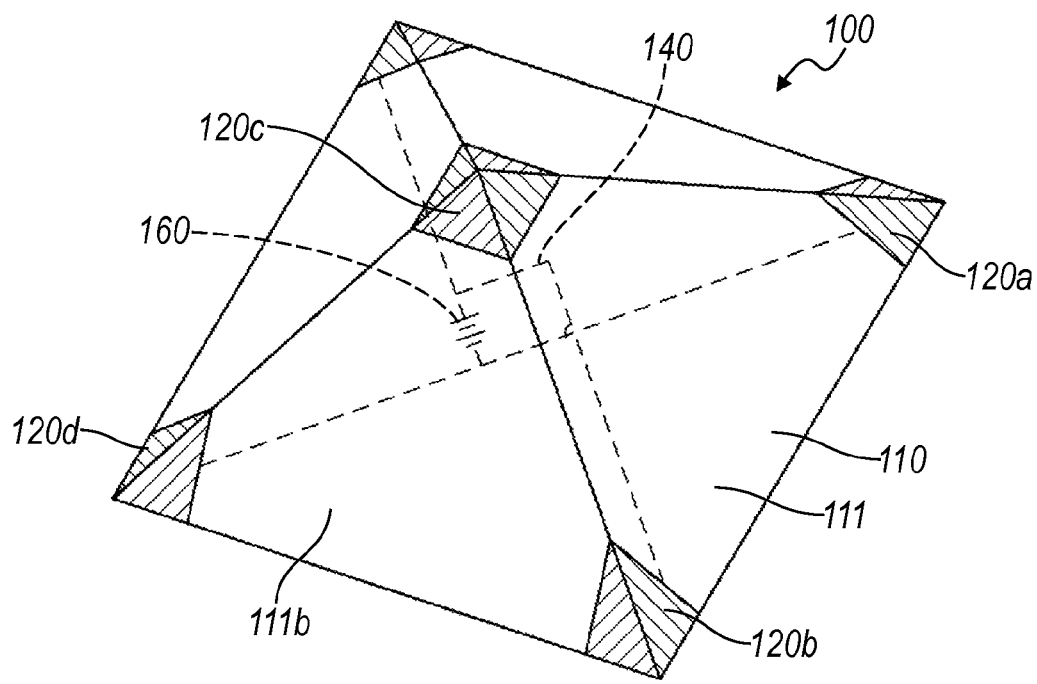

2. The Preferred Embodiments—The Electronic Module:

The electronic module 100 of the preferred embodiments includes: a housing 110 comprising a plurality of faces 111 and a plurality of electrically-conductive toes 120; and a plurality of magnetic elements 130 arranged within the housing 110 with at least one magnetic element 130 proximal each toe 120. The housing 110 functions to define the form factor of the electronic module 100, and the electronic module 100 is preferably configured to interface with a second electronic module 100b of a substantially similar form factor (e.g., similar size, shape, and arrangement and number of toes 120. Each toe 120 extends from one face 111 to an adjacent face 111b to permit coupling of the electronic module 100 with the second electronic module 100b, via a particular toe, in a variety of orientations), as shown in FIGS. 7A, 7B, 8, and 9; each toe 120 thus preferably defines an edge of the housing 110. The housing 110 is preferably rectilinear in geometry, and each toe 120 may further extend to a third face 111c of the housing 110. In a first example shown in FIG. 1A, the housing 110 is square in cross-section and is approximately 6 cm (2.4 in) in width, 6 cm (2.4 in) in depth, and 1 cm (.4 in) in thickness; each toe 120 defines a corner of a broad face of the housing 110 and extends, along a short edge, to a corner opposite the broad face, as shown in FIG. 14, such that the housing 110 comprises four toes 120a, 120b, 120c, and 120d. In a second example shown in FIG. 3A, the housing 110 is triangular in cross section; each toe 120 may thus define an apex of the triangular housing such that the housing 110 comprises three toes 120a, 120b, and 120c. In a third example shown in FIG. 3B, the housing 110 is a tetrahedron in geometry; each toe 120 may thus define an apex of the tetrahedron such that the housing 110 comprises four toes 120a, 120b, 120c, and 120d. However, the housing 110 may be of any other geometry, of any other size, and/or include any other number of toes 120.

The faces 111 of the preferred embodiments function to define a portion of the housing 110 that contains a circuit 140, a processor 150, and/or any other electrical or integrated circuit (IC) component, such as any of the circuits shown in FIG. 4, 5A, 5B or 6. The faces 111 of the housing 110 are preferably electrically non-conductive such that an electrical signal received or transmitted at a toe 120 is not conducted across any face 111 of the housing 110. The faces 111 preferably comprise a polymer such as nylon or acrylonitrile butadiene styrene (ABS), though the face may alternatively comprise: any other plastic material, such as high-density polyethylene (HDPE), polycarbonate (PC), polyurethane (PU), polypropylene (PP), polyvinyl chloride (PVC); glass; a metal with a non-conductive coatings, such as steel with an enamel coating; a paper-based product; a cloth or textile product; or any other suitable material. In the variation of the faces 111 that comprise a polymer, the faces 111 are preferably injection molded and include features that engage features of the toes 120 and/or other faces in such that the faces 111 and toes 120 snap together to form the housing 110. Alternatively, the faces 111 may be machined from billet, stamped, forged, vacuum molded, printed, generated through by stereolithography, or manufactured in any other way. Furthermore, the housing 110 may alternatively be assembled with one or more mechanical fasteners, an adhesive, welding, or other material, feature, or component. The housing 110 preferably comprises a plurality of discreet faces 111 that are assemblable, with the toes 120, to form the housing 110, as shown in FIG. 1C; however, the housing 110 may comprise a single structure that defines all of the faces 111. As shown in FIG. 2, at least one face of the housing 110 preferably defines a removable cover 114 configured to allow a user to access any of the component(s) contained within the housing 110, such as a portion of a circuit 140, a processor 150, a switch, a fuse 142, a light, a solderless plugboard, a data port, etc. However, the faces 111 of the housing 110 may be of any other material, form, or manufacture.

The toes 120 of the preferred embodiments function to communicate electrical signals between the electronic module 100 and an adjacent (second) electronic module 100b or peripheral electronic device. The toes 120 of the housing 110 are electrically conductive and therefore preferably comprise a metal, such as: aluminum; iron and iron alloys, including steel; zinc and zinc alloys, including pot metal; copper and copper alloys, including brass and bronze; silver; gold; or any other metal or alloy thereof. Each toe 120 is preferably die cast, though each toe 120 may alternatively be sand cast, investment cast, machined from billet, sintered, printed, or otherwise manufactured in a metal alloy. Each toe 120 may also require any number of subsequent manufacturing operations, such as post-machining to drill and tap a bore, polishing, or coating. Alternatively, each toe 120 may comprise a composite or polymer base that is coated with an electrically-conductive (metallic) coating, though each toe 120 may be of any other material or combination of materials and manufactured in any other way. Each toe 120 preferably includes a feature by which the toe may be coupled to the circuit 140, the processor 150, or other electrical and/or IC component of the electronic module 100. In a first variation, each toe 120 includes a threaded bore, wherein each toe 120 is secured over a conductive pad on a circuit board by way of a threaded fastener (e.g., a screw). In a second variation, each toe 120 is soldered to a conductive pad of the circuit board. In a third variation, each toe 120 includes a solder pad, and a wire is soldered to the wire pad on one end and coupled to the circuit 140, the processor 150, or other circuit 140 component at the opposing end. In a fourth variation, the circuit 140 comprises a circuit board with a plurality of conductive spring elements (e.g., Bellville washers), wherein each spring element is configured to contact a toe and to communicate an electrical signal therewith. However, each toe 120 may interface with the circuit 140, the processor 150, or other electrical and/or IC in any other way.

Each toe 120 of the electronic module 100 of the preferred embodiments extends from adjacent a first face to adjacent a second face of the housing 110. However, as shown in FIGS. 2 and 7A, each toe 120 may extend to a third face 111c of the housing 110, or any other number of faces. In the variation of the rectilinear housing 110 shown in FIG. 1, each toe 120 may extend from a top of the housing 110, along one or more sides of the housing 110, to the bottom of the housing 110. In the variation of the tetrahedral housing 110, each toe 120 may define an apex of the housing 110 and extend into each of the triangular faces 111 that meet at the apex. The toes 120 may further comprise various facets to provide adequate electrical contact between toes of the electronic module 100 and a second electronic module 100b over various configurations or arrangements of the first electronic module 100 and the second electronic module 100b. For example, the first and second electronic modules 100, 100b may be arranged in a 'stacked' configuration shown in FIG. 7B, an 'adjacent' configuration shown in FIG. 9, a 'perpendicular' configuration shown in FIG. 7A, or an 'off-axis' configuration that is between an adjacent and perpendicular configuration. However, the toes 120 may enable any other arrangement of the electronic module 100 and the second electronic module 100b. Furthermore, a toe 120 may comprise multiple toe components, each toe component coupled to the circuit 140 and extending to a face in of the housing 110, wherein the toe components of the toe 120 are adjacent but disconnected at the exterior surface of the housing 110. Finally, each toe 120 is preferably distinct from any other toe 120, as shown in FIG. 1, though two or more toes 120 may alternatively be physically coextensive.

The electronic module 100 of the preferred embodiments also includes a plurality of magnetic elements 130. A magnetic element is preferably arranged proximal each toe 120, and each toe 120 preferably includes at least one feature that accepts a magnetic element 130, as shown in FIG. 1C. Furthermore, two or more distinct magnetic elements 130 may be arranged proximal each toe. The magnetic elements 130 are preferably substantially similar (e.g., of similar form, material, strength, etc.), and each magnetic element 130 is preferably a permanent magnet, such as a ceramic, Alnico, or rare-earth magnet. Alternatively, each magnetic element 130 may comprise an electromagnet, including a coil arranged around a metallic (e.g., iron) core. In this variation, the magnetic elements 130 may be selectively magnetized, including switching between inducing and not inducing a magnetic field and/or inducing a magnetic field in a first direction and inducing a magnetic field in a second direction opposite the first direction; in this variation, a toe 120 may also serve as a metallic core of the electro-magnetic element 130. However, the magnetic elements 130 may be of any other material and/or of any other type.

Figure 9:
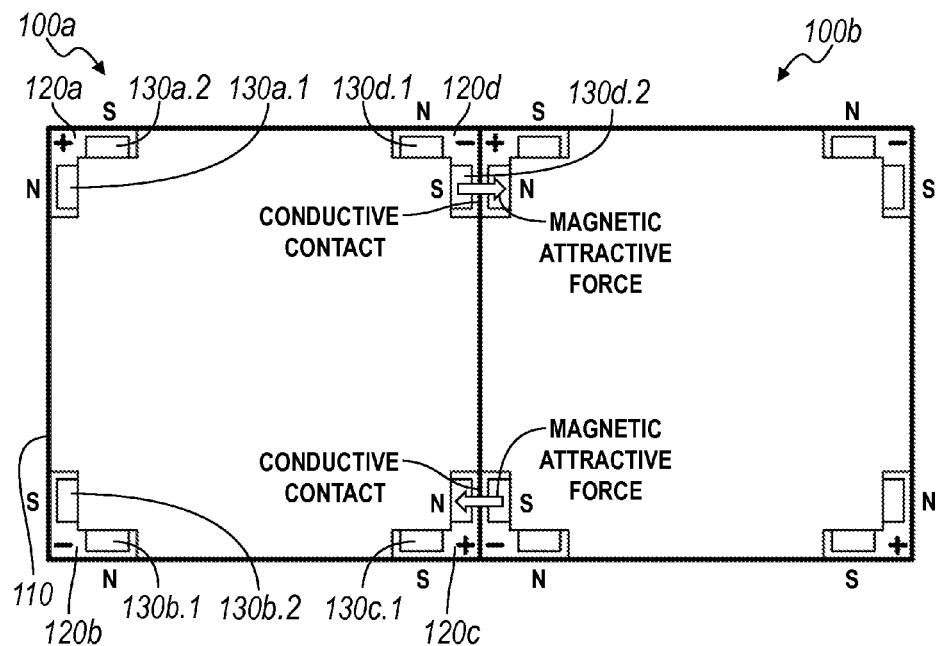
FIG. 9 is a schematic of attractive magnetic forces between two adjacent electronic modules of the preferred embodiments.

The magnetic elements 130 of the preferred embodiments function to define acceptable arrangements of the electronic module 100 adjacent and in contact with a second electronic module 100b. Specifically, the magnetic elements 130 are arranged within the housing 110 and adjacent the toes 120 to ensure that contact between toes 120 of two electronic modules 100, 100b will permit proper transmission of a power and/or a data (e.g., digital, control) signal between the two electronic modules 100, 100b without damaging an electrical or IC component of any of the electronic modules; the arrangement of the magnetic elements 130 may specifically substantially prevent a short across two electronic modules 100, 100b or an improper polarity arrangement across toes of two electronic modules 100, 100b. Thus, the magnetic elements 130 are arranged within the housing 110 of each electronic module 100 such that the magnetic elements 130 provide an attractive force between two electronic modules 100, 100b properly oriented, as shown in FIG. 9, and provide a resistive force against two modules improperly oriented; each magnetic element 130 is therefore assembled within the housing 110 in a specific orientation such that the magnetic field induced thereby points in a direction that permits the plurality of magnetic elements 130 to cooperate to achieve this desired function. Furthermore, the strength of the magnetic elements 130 is preferably such that: a single typical user can conveniently separate two electronic modules 100, 100b by hand; and the typical user is substantially prevented from incidentally contacting a plurality of toes 120 of a first electronic module 100 with a plurality of toes 120 of a second electronic module 100b when the first and second electronic modules 100, 100b are improperly oriented relative to one another.

In one example of a pair of the rectilinear electronic modules 100, 100b shown in FIG. 2, the arrangement of the magnetic elements 130 proximal the four toes 120 of each electronic module 100 permit fifty-six (or more) proper orientations of the first electronic module 100 with at least two toes of each electronic module in contact; some of these potential orientations are shown in FIG. 7A, 7B, 8, 9, 13; the magnetic elements 130 are configured to retain the first electronic module 100 against the second electronic module 100b in any of these proper configurations. However, the magnetic elements 130 may be arranged in any way and permit and/or resist any other configuration.

Figure 12A:
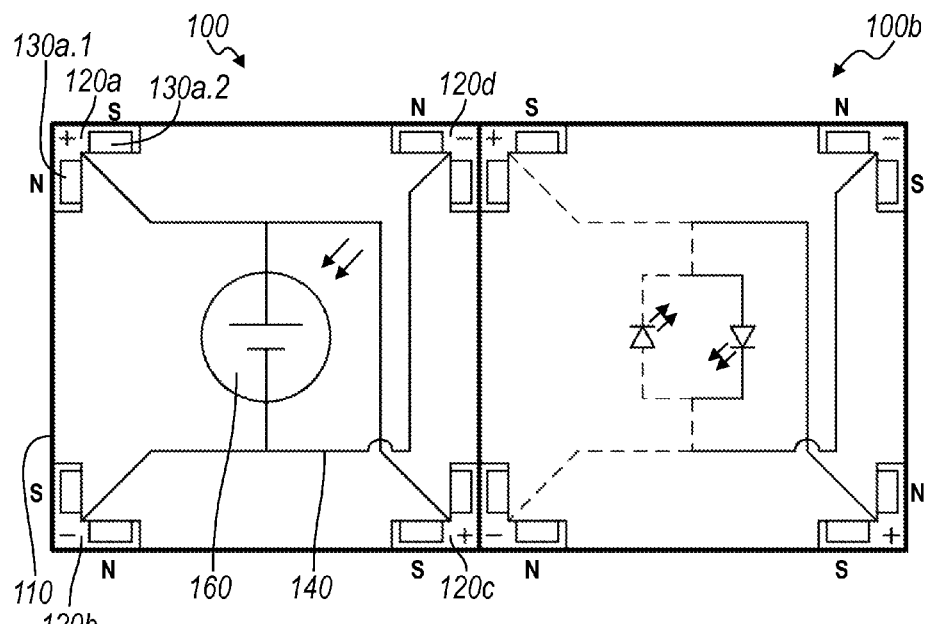
FIG. 12A is a schematic of adjacent first and second electronic modules, of the preferred embodiments, with the second electronic module operating in a first mode.

The circuit 140 of the electronic module 100 of the preferred embodiment functions to enable at least one functionality of the electronic module 100. The circuit 140 is preferably operable between two modes, including: a first mode when a plurality of toes 120 of the first electronic module 100 are in contact with a plurality of toes 120 of a second electronic module 100b in a first orientation (shown in FIG. 12A); and a second mode when a plurality of toes 120 of the first electronic module 100 are in contact with a plurality of toes 120 of a second electronic module 100b in a second orientation (shown in FIG. 12B). The first orientation may comprise contact of the first and second toes 120 of the electronic module 100 with the first and second toes of a second electronic module 100b; the second orientation may comprise contact of the second and third toes 120 of the electronic module 100 with the second and third toes of the second electronic module 100b. However, the first and second orientations may comprise suitable contact between any other toes of the electronic module 100 and second electronic module 100b.

Figure 12B:
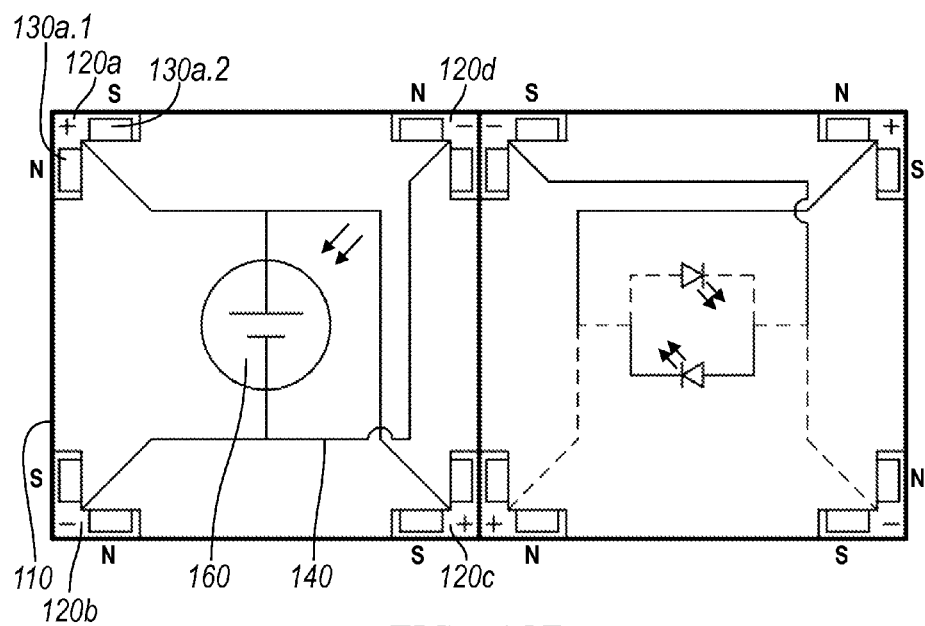
FIG. 12B is a schematic of adjacent first and second electronic modules, of the preferred embodiments, with the second electronic module operating in a second mode.

To operate in the first and second modes, the electronic module may: in the first mode, route current from the first and second toes 120a, 120b through a first portion of the circuit 140; and, in the second mode, route current from the second and third toes 120b, 120c through a second portion of the circuit 140. In one variation shown in FIGS. 12A and 12B, the electronic module 100 is a light module in which the circuit 140 comprises a first portion including a first LED (light-emitting diode) 144a of a first color and a second portion including a second LED 144b of a second color; the first LED 144a is coupled to the first and second toes 120a, 120b and is lit in the presence of a voltage potential across the first and the second toes 120a, 120b (the first mode), and the second LED 144b is coupled to the second and third toes 120b, 120c and is lit in the presence of a voltage potential across the second and the third toes 120b, 120c (the second mode). In this example, the first and second LEDs 144a, 144b are arranged in parallel, cathode to anode, between the first and second sides of the circuit such that, in the first mode, current passes through the first LED 144a but not the second LED 144b (FIG. 12A), and, in the second mode, current passes through the second LED 144b but not the first LED 144a (FIG. 12B). In a variation of the electronic module 100 that is the control module 200, the circuit 140 functions: in the first mode, to route a signal (an output) from a processor 150 to the first and second toes 120a, 120b for transmission to an adjacent electronic module 100b; and, in the second mode, to route a signal (an input) from an adjacent electronic module 100b to the processor 150 via the second and third toes 120. In a variation of the electronic module 100 that is an electromechanical actuator module, the circuit 140 functions: in the first mode, to induce motion of the actuator in a first direction; and, in the second mode, to induce motion of the actuator in a second direction. However, the circuit 140 may perform any other function or plurality of functions in any other way, and the circuit 140 may also operate in the first and second modes simultaneously.

In general, the electronic module 100 is preferably capable of a particular function, as enabled by the circuit 140 and/or any other component of the electronic module 100. Suitable functions for the electronic module 100 may include any of the following: providing power (a power module); generating commands (a control module 200); sending and/or receiving data or commands wirelessly (a wireless communication module); interfacing with a user (a human interface module); interfacing with prototype circuit components (a solderless plugboard/breadboard module); displaying information to a user (a display module); capturing an event or input (a sensor module); interfacing with an external/peripheral electronic device (a smartphone interface module); storing data (a data storage module); providing light (a light module); providing a physical force (an electromechanical actuator module); bridging power to a second electronic module 100b (a power bridge module); or any other suitable function. The electronic module 100 preferably performs at least one function, though the electronic module 100 may perform a plurality of functions independently or in cooperation with any other electronic module(s). The electronic module 100 further provides and/or receives at least one power, data, and/or control signal via a plurality of (e.g., two) toes 120. In the variation of the electronic module 100 that is a power module, the electronic module 100 preferably transmits a DC (non-alternating) power signal through two toes 120a, 120b, wherein the power source 160 creates a voltage potential across the two toes 120a, 120b. In this variation, one toe 120b is preferably held at ground (GND, reference 0V) and another toe 120 is held at a voltage (e.g., Vcc, +3.3V, +5V, +12V) above ground. In an alternative variation of the electronic module 100 that is not a power module and/or does not contain a power source 160, two toes 120a, 120b of the electronic module 100 preferably receive power: by interfacing directly with two toes of a power module; or by interfacing with two toes of a second electronic module 100b arranged between the electronic module 100 and the power module.

The electronic module 100 is preferably configured to send and/or receive a non-alternating (i.e., DC) power signal and a digital signal, such as a data or control signal, that is combined with the DC power signal. Therefore, the electronic module 100 preferably further includes a filter 147 configured to separate a received digital (data or command) signal from an analog (power) signal, as shown in FIG. 6. The filter 147 preferably comprises a low-pass filter, a high-pass filter, and a bandgap filter, though the filter 147 may include any other suitable component(s). Alternatively, the electronic module 100 may incorporate a rectifier in combination with a phase-reversal analog switch to separate the digital signal from the power signal. However, the analog and digital signals may be separated and/or analyzed in any other way. Furthermore, the digital signal may be isolated from the combined power-data signal without substantially altering the original combined power-data signal. This may be beneficial in variations of the electronic module 100 intended to receive the complete power-data signal from one electronic module 100 and then to communicate the complete power-data signal, substantially unmodified, to a second electronic module 100b. This may be beneficial in a variation of the electronic module set 300 that comprises three or more electronic modules, including a control module configured to control all other electronic modules simultaneously with a single transmitted data signal.

In a first variation of the electronic module 100 that is configured to send and to receive digital signals over a power signal, digital bits transmitted by the electronic module 100 represent positive voltage spikes in the combined power-data signal, and digital bits received by the electronic module 100 represent negative voltage spikes in the combined power-data signal, or vice versa. In a second variation, the electronic module 100 of a first type (e.g., a control module 200) transmits digital bits that are voltage spikes of a first magnitude and a second electronic module 100b of a second type (e.g., a sensor module) transmits digital bits that are voltage spikes of a second magnitude. In this second variation, a plurality of signals transmitted by multiple electronic modules 100, 100b, substantially simultaneously and combined into a single power-data signal, may be isolated into a power signal and multiple discreet digital signals from multiple distinct electronic modules 100, 100b based upon the magnitude of voltage spikes that represent transmitted digital bits from various electronic modules; specifically, the magnitude of a voltage spike may distinguish an output by one electronic module 100 from the output of another 100b. In this second variation, a plurality of filters 147, rectifiers, phase-reversal analog switches, and/or other components or circuitry may be necessary to substantially simultaneously isolate a plurality of digital signals from the power signal. However, the digital signal may be of any other form and combined with the power signal in any other way, and the power and digital signals may be isolated by any other suitable method.

In the electronic module 100 configured to receive a digital signal over a power signal, once the digital and power signals are isolated, the discreet signals are preferably routed to respective portions of the electronic module 100. For example: the digital signal may be routed to a digital pin of a shift register 148 or a processor 150 (e.g., microprocessor) within the electronic module 100; and the power signal may be routed to power pins (e.g., Vcc and GND) of the shift register 148 or processor 150, to additional components within the electronic module 100 requiring power, and to additional toes 120 of the electronic module 100 to communicate power to additional electronic modules 100, 100b. However, the digital and power signals may be disseminated within and/or through the electronic module 100 in any other way.

In a first example of combined power-data signal communication between electronic modules 100, 100b, a first electronic module 100 is a power module, a second electronic module 100b is a control module 200, and a third electronic module 100 is an electromechanical actuator module with an electric motor coupled to an encoder; each electronic module 100 comprises four toes 120, as in the rectilinear electronic module 100 described above and shown in FIG. 2; the first and second toes of the power module are in contact with the first and second toes of the control module 200 and the control module 200 is thus powered; the third and fourth toes of the control module 200 are in contact with the third and fourth toes of the electromechanical actuator module; a processor 150 in the control module 200 manipulates the voltage potential across the third and fourth toes thereof to vary the speed of the motor, and the encoder of the electromechanical actuator module induces voltage spikes across the third and fourth toes thereof to indicate to the processor 150 that the output shaft of the motor has completed a particular angular displacement. In a variation of this first example, the second toe of the power module functions as the ground terminal (e.g., GND, reference 0V) and the first toe functions as the positive voltage terminal (e.g., Vcc); the first and second toes of the control module 200 are in contact with the first and second toes of the power module, respectively; the second and third toes 120 of the control module 200 are in contact with the second and third toes of the electromechanical actuator module, respectively; the second toe 120b of the electromechanical actuator module is held at the reference ground voltage, the encoder sends a negative voltage spike to the control module 200 via the third toe 120c thereof, and the control module 200 manipulates the voltage across the second and third toes 120 thereof the vary the speed of the motor. Therefore, the control module 200 and electromechanical actuator module may function regardless of which toes of the control module 200 are in contact with any set of toes of the electromechanical actuator module.

In a second example of combined power-data signal communication between two electronic modules 100, 100b, a first electronic module 100 is a power module, a second electronic module 100b is a control module 200, and a third module is a light module with a shift register 148 controlling a series of LEDs 144 (circuit shown in FIG. 5B); each electronic module comprises four toes, as in the rectilinear electronic module 100 described above and shown in FIG. 2; the first and second toes of the power module are in contact with the first and second toes of the control module 200 and the control module 200 is thus powered; the third and fourth toes of the control module 200 are in contact with the third and fourth toes of the light module; the third and fourth toes of the control module 200 are held to the same voltage potential as that of the first and second toes to power the light module; the processor 150 induces voltage spikes across the third and fourth toes to set and clear bits of the shift register 148 of the light module; and the shift register 148 sets the state of the LEDs 144 (ON or OFF) based upon the states of the bits therein.

In a first example of combined power-data signal communication between electronic modules, the electronic modules contribute to a "data cloud," wherein electronic modules coupled through respective toes send and/or receive digital information to and/or from other modules by adding or extracting data into a digital signal communicated across multiple electronic modules. The electronic module 100 may require necessary filters to separate a data signal from the DC power signal as well as encoder/decoders necessary to translate digital communications (e.g., electronic pulses) into numerical values or intelligent signals. Any electronic module participating in the data cloud may have a unique address such any particular electronic module may extract data intended for the particular electronic module. Specifically, all messages in the data cloud may contain both the address of the electronic module from which the message originates and the address of the intended electronic module recipient. All electronic modules so connected may be notified of the presence of a data package by the presence of the pulsing signals; the electronic modules may then decode the data package to determine the intended recipient thereof. To send messages, an electronic modules may poll the DC power line to verify that no message is currently being communicated (e.g., through the absence of an digital signal over the power signal) before sending a data package. To prevent collisions of data during transmission, randomized delays may be used to reduce the likelihood that one electronic module checks the data line at the same time as a second electronic module. However, data over power communications between electronic modules 100, 100*b* may be conducted in any other way.

Figure 10:
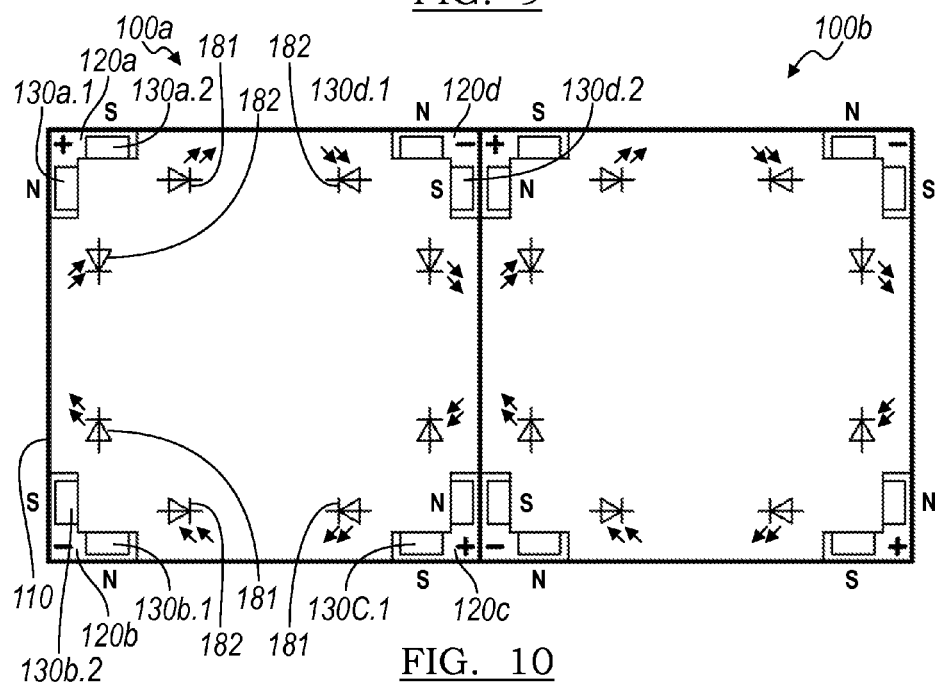
FIG. 10 is a schematic of optical data communication between two adjacent electronic modules of the preferred embodiments.

However, the electronic module 100 may wirelessly communicate with one or more additional electronic modules 100, 100*b*. As shown in FIG. 10, the electronic module 100 may include one or more optical emitters 181 and optical detectors 182. The arrangement of the optical emitter(s) 181 and detector(s) 182 shown in FIG. 10 may permit data communication, between the electronic module 100 and an adjacent electronic module 100*b*, that is separate from the power signal. Fiber optics may also or alternatively be implemented in the transmission of data between electronic modules. However, any other component(s) may be implemented in the electronic module 100 to enable communication of data with any other electronic module 100*b* within a system of electronic modules 300.

The electronic module 100 of the preferred embodiments may further incorporate any number of additional features and/or components. In one variation, the electronic module 100 further comprises a data port 201 that passes through at least one face of the housing 110 and couples to the circuit 140 and/or processor 150 to enable communication with an external device, as shown in FIG. 6. For example, the data port may be a universal serial bus (USB) port, a ⅛" headphone jack, an RS-232 port, or any other suitable port that enables communication of data between the electronic module 100 and at least one of: a desktop, laptop, or tablet computer; a smartphone; a cellular phone; a PDA; a digital watch; a personal music (MP3) player; headphones; a microphone; a credit card reader; a printer; industrial manufacturing equipment (e.g., a CNC milling machine); a multi-track digital audio recorder; automotive diagnostic equipment; or any other suitable external device. The data port may enable communication of any of: a digital signal (the data I/O port 201*a*); an analog signal (the analog I/O port 201*b*); serial communications (the serial I/O port 201*c*); or any other communication type or protocol.

In a second variation, the housing 110 is substantially sealed to prevent contamination of the components within the housing 110 (e.g., the circuit 140, the processor 150) by water, dust, dirt, or other contaminant(s). O-rings, gaskets, RTV—or silicone sealant, or any other sealing means may be employed to prevent leaks between a toe 120 and a face in, between a face in and a removable cover 114, around a data port 201, or around any other component(s) of the electronic module 100.

In a third variation, the electronic module 100 further includes electromagnetic shielding 141 around at least a portion of the circuit 140 and/or processor 150 to substantially isolate the portion of the circuit 140 and/or processor 150 from stray radio waves or electromagnetic or electrostatic fields. The shielding 141 may be sheet metal or metal foil, a metal screen, a metal foam, or any other suitable material in any other suitable form.

Figure 4:
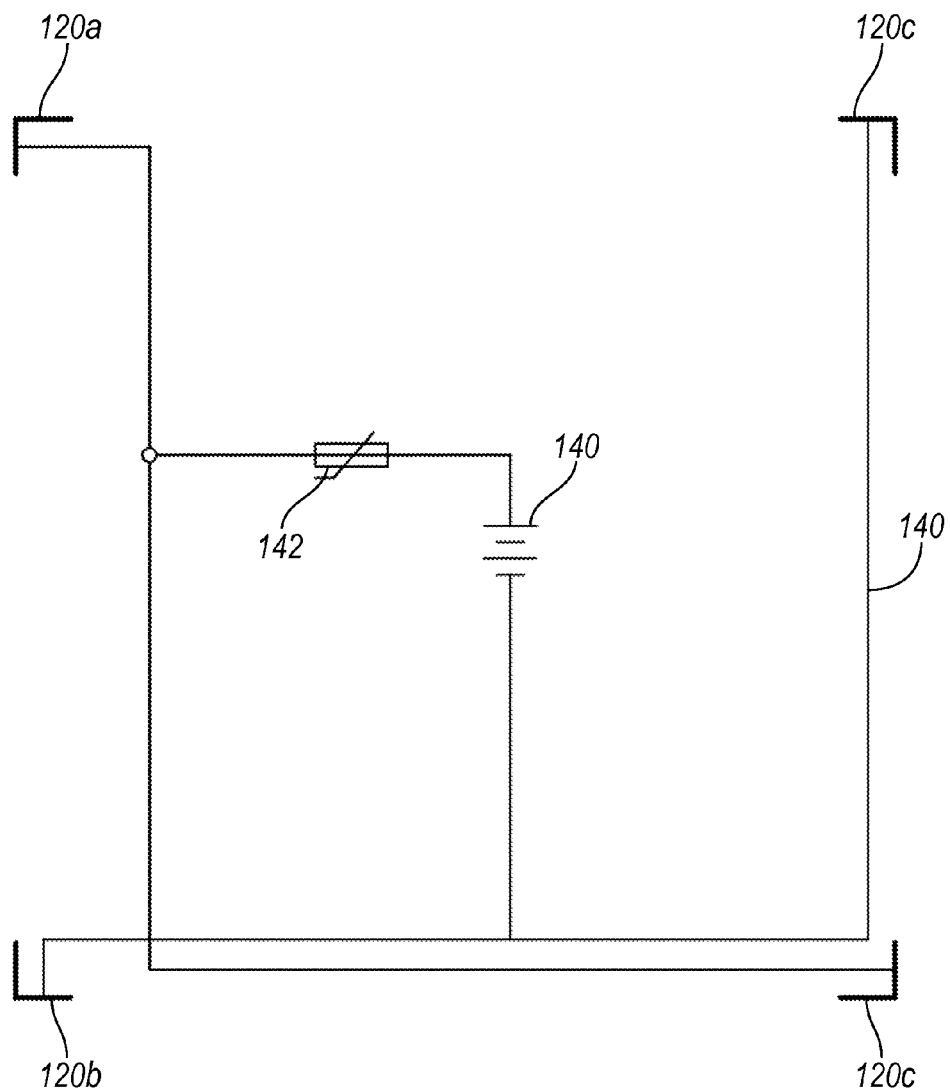
FIG. 4 is a circuit schematic of the first and third preferred embodiments.
Figure 5A:
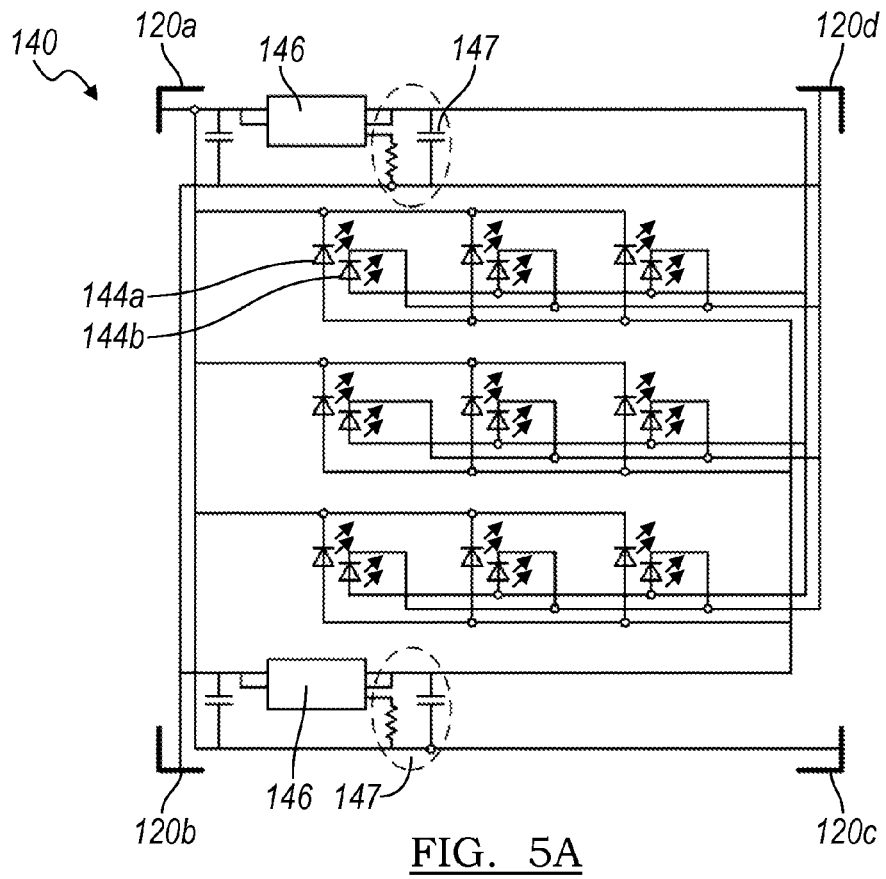
FIGS. 5A and 5B are circuit schematics of the first and third preferred embodiments.
Figure 5B:
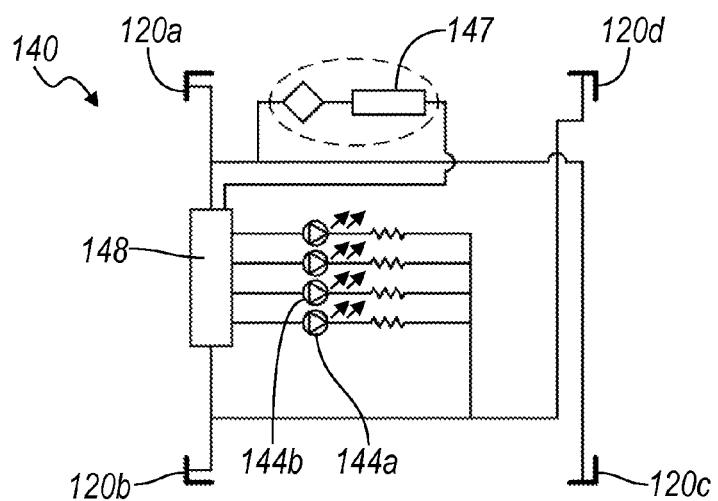

In a fourth variation, the circuit 140 further includes at least one fuse 142 arranged between a toe and a portion of the circuit 140 (as shown in FIG. 4), wherein the fuse 142 is configured to protect the portion of the circuit 140 from shorts, excessive current, and/or reversed polarity in the event that two electronic modules 100, 100*b* are improperly coupled. The fuse 142 is preferably a resettable fuse, wherein the user may (by removing the removable cover 114) access the fuse 142 and reset the fuse 142 to restore functionality to the circuit 140 after the fuse 142 is tripped. Alternatively, the fuse 142 may be a polyswitch.

In a fifth variation, the circuit 140 further comprises a magnetic switch (e.g., reed switch or Hall effect sensor) arranged between a portion of the circuit 140 and a toe 120, wherein the magnetic switch is configured to electrically couple the toe 120 to the portion of the circuit 140 in the presence of a magnetic field, proximal the toe 120, that points in a first proper direction; also or alternatively, the switch may be configured to electrically decouple the toe 120 from the portion of the circuit 140 in the presence of a magnetic field, proximal the toe 120, that points in a second improper direction different than the first proper direction; the magnetic switch preferably senses a magnetic field, proximal the toe 120, that is generated by a magnetic element of a second electronic module 100*b*. The magnetic switch may thus enable the portion of the circuit 140 given only a magnetic field, proximal the toe 120, that points in a proper direction; this may have the benefit of protecting a particularly sensitive portion of the circuit 140 from damage caused by improper orientation of the electronic module 100 and a second electronic module 100*b*.

In a sixth variation, the electronic module 100 further includes a shift register 148, coupled to the circuit 140, the processor 150, the filter 147, the rectifier, and/or any other component of the electronic module 100. The shift register 148 may be a serial-input, parallel-output shift register that receives a series of bits from a processor 150 and controls a series of other components, such as LEDs or actuators, based on the bits set and cleared therein. Alternatively, the shift register 148 may be a parallel-input, serial-output shift register that collects a series of input from other components, such as sensors and switches, as set and cleared bits and presents the bits to a processor 150. The shift register 148 may thus increase the functionality of the electronic module 100 and/or electronic module set 300 by increasing the number of available inputs and/or outputs for the electronic module 100. However, the electronic module 100—and each additional distinct electronic module—may perform any other function (independently or in conjunction with a second electronic module), communicate and receive any other signal(s) in any other way, interface with any other electronic module in any other way, and include any other suitable or necessary component(s).

3. The Preferred Embodiments—The Electronic Module Set:

The electronic module set 300 of the third preferred embodiment includes a plurality of the electronic modules 100, 100*b* of the first and/or second preferred embodiments, wherein at least one of the electronic modules (the 'first electronic module 100') is a power module configured to accept a power source 160 and to transmit power, from the power source 160, through a plurality of toes 120 thereof. A second electronic module 100*b* of the electronic module set 300 may be any suitable type of electronic module, such as a second power module, a control module 200, a wireless communication module, a sensor module, a solderless plugboard module, a peripheral electronic device interface module, a data storage module, an electrometrical actuator module, a light module, or any other suitable type of module. The combination of the electronic modules 100, 100*b* of the electronic module set 300 preferably enable certain or additional functionalities. Furthermore, the electronic modules 100, 100*b* are preferably of substantially similar form factors, as shown in FIG. 7A, 7B, 8, and 9.

The electronic module set 300 and the electronic modules 100, 100*b* of the preferred embodiments preferably provide a variety of functions when arranged in a variety of orientations and/or in combination with at least one other electronic module 100. In a first example of the electronic module set 300 shown in FIG. 14, the first electronic module 100 that is a battery-based power module is directly coupled: to the second electronic module 100b that is a peripheral electronic device (e.g., iPhone) interface module; to two speaker-based electromechanical actuator modules 100c, 100d; and to a first photovoltaic-based power module woe. Furthermore, in this first example, the first electronic module 100 is indirectly coupled to a second and a third photovoltaic-based power module 100f, 100g. In this example, the first electronic module 100 is arranged beneath the second electronic module 100b in a first type of configuration (the 'stacked' configuration), and the first electronic module 100 and the speaker-based electromechanical actuator module are arranged beside each other in a second type of configuration (the 'adjacent' configuration). One application of this first example of the electronic module set 300 is to play music through the two speakers based on a signal provided by the peripheral electronic device, wherein the speakers are powered by the photovoltaic cells and wherein the battery boosts power to the speakers when there is excess power demand and stores power when the photovoltaic cells are providing excess power.

In a second example of the electronic module set 300 shown in FIG. 7A, the first electronic module 100 that is a photovoltaic-based power module is directly coupled to the second electronic module 100b that is a light module and to three battery-based power modules. In this second example, the first electronic module 100 is arranged substantially perpendicular the second electronic module 100b and other electronic modules in a perpendicular configuration.

A user may therefore assemble various electronic modules to enable various functions. In a first variation, the electronic module set 300 is an educational tool, wherein the combinations of electronic modules provide insight into how distinct systems (e.g., a power module, a sensor module, a control module) may be cooperate to increase, improve, or modify functionality. In this first variation, the electronic module set 300 may also or alternatively be a means for a user or student to build increasingly complex electronic and/or electromechanical systems, the electronic module set 300 thus serving as an electronic/electromechanical variation of mechanical interlocking bricks (e.g., LEGOs). In a second variation, the electronic module set 300 is a modular platform configured to aid rapid prototyping of electronic/electromechanical systems, wherein a user or engineer may assemble various modules and upload source code or software to a control module 200 to test a given functionality before moving into more expensive customized hardware and/or more robust source code. In a third variation, the electronic module set 300 is a complete electronic/electromechanical system providing a specific functionality that is upgradable over time. For example, the electronic module set 300 may be a complete desktop computer that function solely given a control module 200, display module, human interface module, and power module; the user may subsequently add additional functionality by installing a wireless communication module and/or additional data storage modules adjacent any existing module in the electronic module set 300; the user may also convert the computer into a telepresence robot by adding a camera module and a plurality of electromechanical actuator modules that each include a motor and a wheel. In a fourth variation, the electronic module set 300 is a security system, wherein various distinct subsystems of a plurality of electronic modules are assembled and arranged in various portions of a building to trigger an alarm given certain signals or events, such as forced entry or the presence of smoke. In a fifth variation, the electronic module set 300 is an exploration kit comprising various modules providing various functions for deep sea and/or space exploration, such as a buoyancy module and a specimen collection module. In this fifth variation, electrical contact and communication between modules may be solely via the toes thereof, which may eliminate the need for secondary connectors and may provide improved sealing of the housing 110 of each electronic module 100 improved resistance to harsh environments. However, the electronic module set 300 may provide any other functionality, be suited for any other application, or be used for any other purpose.

Figure 8:
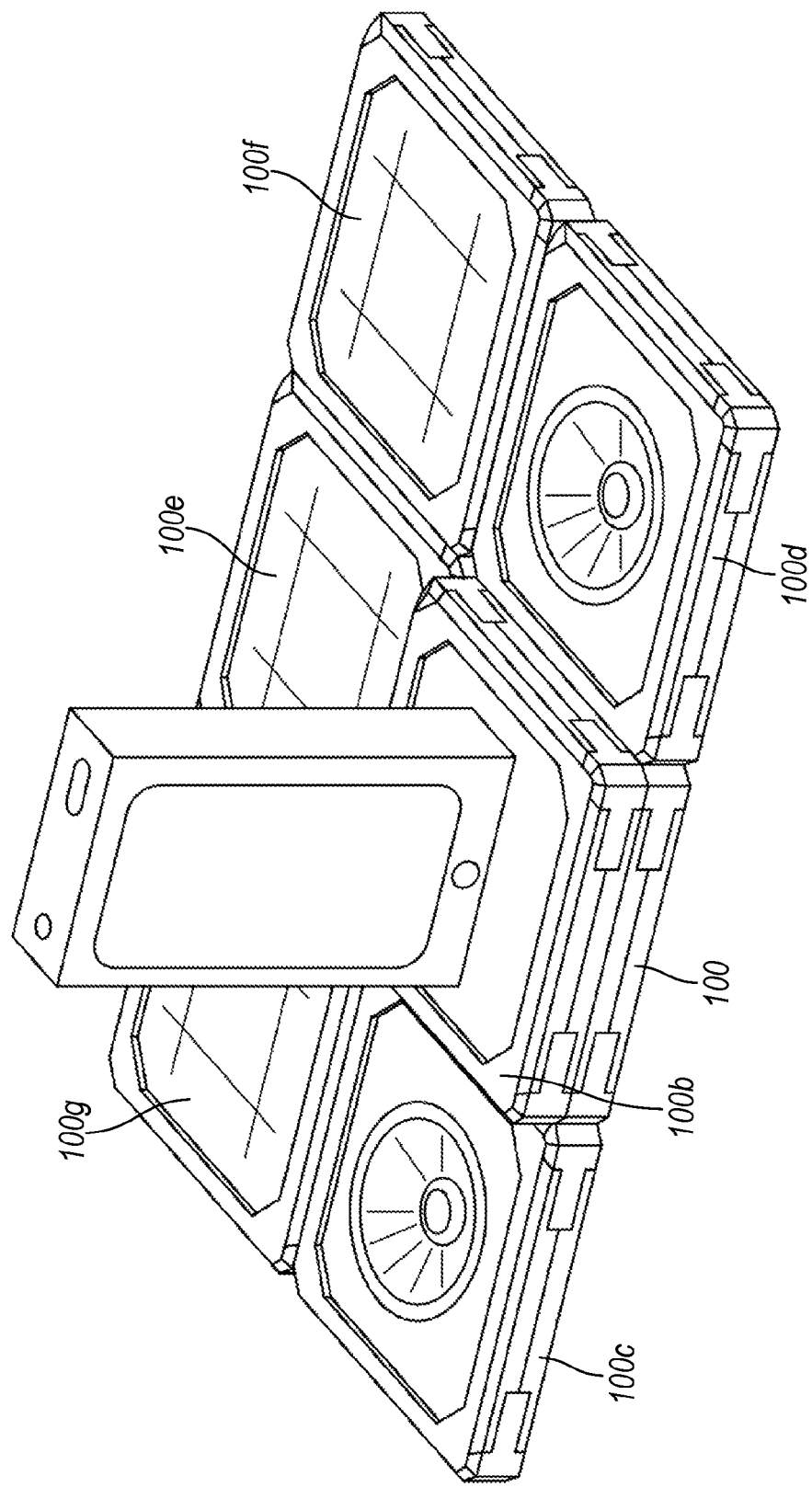
FIG. 8 is an isometric view of a plurality of electronic modules.

4. Example Electronic Modules—The Control Module:

One variation of the electronic module 100 is a control module 200 that functions to provide computing power to one or more other electronic modules. The control module 200 preferably includes at least one processor 150, and the processor 150 is preferably a microprocessor, such as the ATmega168 manufactured by Atmel or the HCS12/C32 manufactured by Motorola; the processor may also comprise other systems, such as a Beagle Board or Raspberry Pi processor, or any other operating system, such as Linux. The processor 150 preferably includes: internal memory; an arithmetic logic; a control logic; a plurality of digital and/or analog input pins (201a, 201b); a plurality of digital output pins (201a, 201b); an internal or external clock; an analog-to-digital (A/D) converter; and any other necessary component(s). The processor 150 preferably functions in accordance with a program, software, firmware, an operating system, or other code uploaded and stored on the processor 150; this code preferably dictates the functions and interactions of the processor 150 with external components or circuits, such as additional electronic modules connected to the control module 200. Furthermore, the processor 150 is preferably programmable (e.g., reprogrammable), wherein a user may connect the control module 200 to a peripheral electronic device, such as a computer, a smartphone, or a PDA, in order to upload new or modified code to the processor 150. The control module 200 therefore preferably includes a port (e.g., serial port 201c) by which user code and/or data may be communicated between the processor 150 and the peripheral electronic device. The port may enable a physical (wired) connection, such as a port that is a CAT-4, CAT-5, CAT-9, RS-232, or USB port; alternatively, the port may enable wireless communication, such as via a Wi-Fi, 3G or 4G cellular, Bluetooth, Zigbee, XBee, RF, or IR wireless connection. The processor 150 may alternatively receive code and/or communicate data with the peripheral electronic device via a second electronic module 100b (e.g., a communication module), wherein the second electronic module includes a wired or wireless port configured to communicate with the peripheral electronic device, as shown in FIG. 8. The processor 150 is preferably configured to receive C-based code or a form of C-based code (e.g., Processing, the Arduino language), but may alternatively operate based upon any other coding language or script, software, or operating system platform. However, the processor 150 may include any other components and function in any other way.

The processor 150 is preferably configured to receive power through a plurality of toes 120 of the housing 110, to transmit an output through at least one toe, and to receive an input through at least one toe. The processor 150 is preferably configured to control a function of a second electronic module 100b with which the control module 200 is coupled. For example, the processor 150 may toggle the state of an LED in the second electronic module 100b, control the position of an electromechanical actuator, transmit or receive information from the internet including social media sites such as Twitter and Facebook, control the flow of data to and from a data storage module, or control the output of a digital display. Furthermore, the processor 150 is preferably configured to receive an input from a second electronic module 100b, wherein the input controls a function of the processor 150 and/or is manipulated by the processor to generate or alter a command. For example: the processor 150 may receive a input signal indicating that a switch has been closed (e.g., a user pushed a button) on an interface module and the processor 150, in response to the input, toggles the state of an LED; or the processor 150 may receive an input signal indicating the level of light proximal a sensor module and the processor 150 may update a digital segment display based upon the input signal. However, the processor 150 may perform any other function and receive any other type of signal.

The processor 150 preferably sends and/or receives a digital signal that is combined with a DC power signal transmitted between electronic modules. The processor 150 is preferably in communication with a filter 147, a rectifier, and/or a phase-reversal analog switch to separate the power and digital signals. Alternatively, the processor 150 may receive the combined input power-data signal and process the signal directly to extract relevant data. To transmit data, the processor 150 may generate negative voltage spikes in an output power-data signal, such as by selectively coupling the power signal to a load (e.g., resistor) via a transistor (e.g., MOSFET, BJT). Alternatively, the processor 150 may generate positive voltage spikes in the output power-data signal, such as by selectively coupling the power signal to a buck-boost circuit that generates a voltage greater than the power voltage. However, the processor 150 may use any other method, means, component, or combination of components to send and/or receive signals via a plurality of toes 120 of the housing 110. Furthermore, any other electronic module 100 may use any of these methods, means, components, or combinations of components to send and/or receive signals with any other electronic module.

Because the control module 200 may possibly only communicate with another electronic module 100 (or external peripheral device) via two toes (e.g., two pins, two contacts), the processor 150 is preferably configured to communicate via inter-integrated circuit (I2C) communication protocol, wherein the processor 150 may operate in both master and slave modes to send and receive data between another electronic module or peripheral device despite the limited number of physical connections therebetween. To initiate communication therewith, the processor 150 preferably transmits a digital signal (e.g., a timed series of bits) to the module or device to set the mode (master or slave) of the second processor or shift register 148; this communication preferably occurs substantially soon after a connection is made between the control module 200 and the second electronic module 100b or external device, such as soon after two or more toes of the control module 200 and the second electronic module 100b make contact. Alternatively, the second processor or shift register may send, to the processor 150, a host notify protocol that signals to the processor 150 to operate in a master or slave mode in preparation for data communication or simply to notify the processor 150 that a second electronic module 100b or external device has been connected. However, the processor 150 may also or alternatively communicate with another electronic module or external device via 1-Wire protocol or any other master-slave or peer communication protocol.

Finally, the processor 150 may communicate with and control any number of additional electronic modules 100, 100b. The processor 150 may transmit a control signal only following a change therein over a previously-transmitted control signal, which may have the benefit of reducing power consumption of the processor 150 and/or other electronic modules 100, 100b. Alternatively, the processor 150 may continuously stream the control signal, such as on an interval set by an internal clock. The processor 150 may also continuously monitor for changes in input signals from any number of other electronic modules; in this variation, the processor 150 may serially ping a second processor or shift register 148 of another electronic module coupled to the control module 200. Alternatively, a second processor or shift register 148 of any other electronic module, coupled to the control module 200, may ping the control module 200, such as via a host notify protocol, to initiate communication of the input signal to the control module 200 following a change of state of a sensor or other event necessitating such communication. However the processor 150 and the control module 200 may function in any other way.

5. Example Electronic Modules—Power Module:

As shown in FIG. 4, one variation of the electronic module 100 is a power module that functions to provide power through a plurality of toes 120. The power module may comprise or be configured to accept any of: a photovoltaic cell or array; a battery; a fuel cell; a fuel-based generator; a human-power generator; a heat (e.g., Stirling) engine; a wall-outlet plug; or any other suitable power source 160. The power module may also include a variety of power sources, such as a photovoltaic array coupled to a battery, wherein the battery charges during when the photovoltaic array produces excess power, and wherein the battery discharges when the photovoltaic array is not producing enough power for a given load. In the variation of the power module configured to accept a battery, the housing 110 preferably further includes a removable cover 114, wherein a user may remove the removable battery to access, remove, and/or replace a battery of the power module. In this variation, a portion of the toes 120 may cooperate (in conjunction with a portion of the magnetic elements 130) to charge the battery or batteries by inductive charging; specifically, a portion of the toes 120 may generate current when in the presence of an alternating electromagnetic field proximal the housing 110, wherein the current charges the battery. However, the battery may be recharged via a conventional charging jack or port (e.g., USB) or may not be rechargeable.

The power module preferably includes and ON/OFF switch, wherein the a user may selectively couple the power source 160 with any of the toes 120 of the housing 110; the ON/OFF switch is preferably arranged on or through a face of the housing 110 such that the switch is substantially easily accessed by a user. Also or alternatively, the power module may include bypass circuitry such that the power source 160 may be decoupled from one or more toes 120, given a particular configuration with one or more other electronic modules 100, 100b, to reduce or eliminate a load associated with the power module; this may be particularly beneficial in the variation that incorporates a photovoltaic cell or array. The bypass circuitry may be controlled by a control module 200, wherein the control module 200 transmits a signal to the power module to selectively connect the power source 160 to toes 120 of the power module; alternatively, the bypass circuitry may include passive circuit elements, such as diodes or transistors, to selectively connect the power source 160 to the toes 120 of the power module.

The power module may also include any of a voltage regulator 146, a buck-boost circuit, or a resistive load that regulates or changes the voltage potential across a plurality of toes 120 of the power module. In the variation of the power module in which any of the aforementioned components are coupled to fewer than all of the toes 120 of the housing 110, the power module may operate in a plurality of modes: in a first mode, the power module may output a first voltage (e.g., 5V) through the first and second toes 120a, 120b; in a second mode, the power module may output a second different voltage (e.g., 3.3V) through the second and third toes 120b, 120c. However, the power module may function in any other way and include any other component(s) and/or power source(s) 160.

Figure 11A:
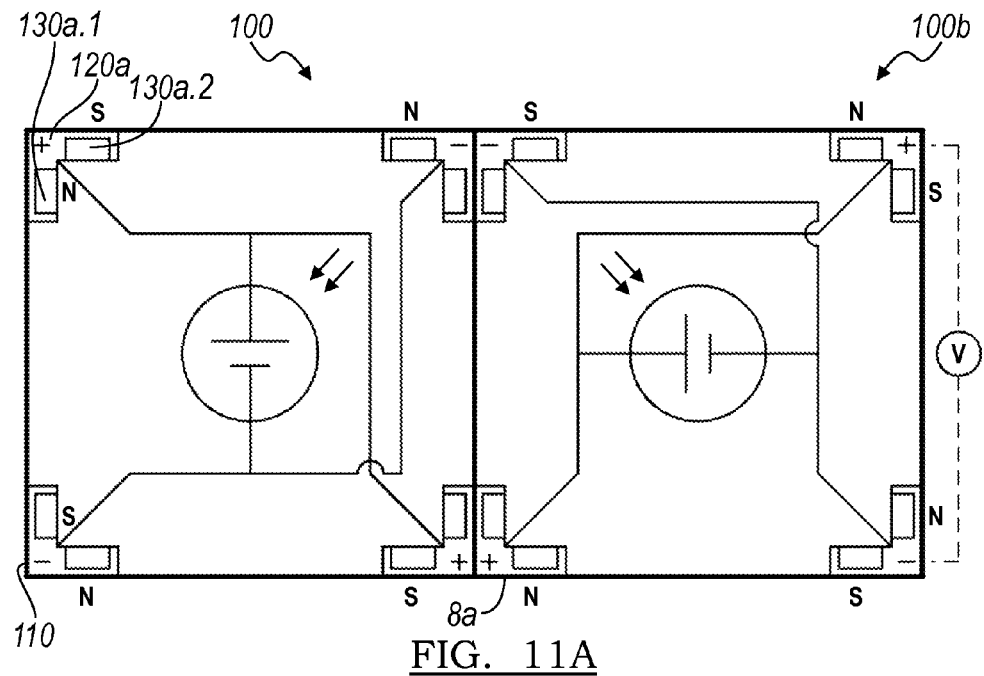
FIG. 11A is a schematic of two adjacent electronic modules, of the preferred embodiments, arranged with the circuits thereof connected in parallel.
Figure 11B:
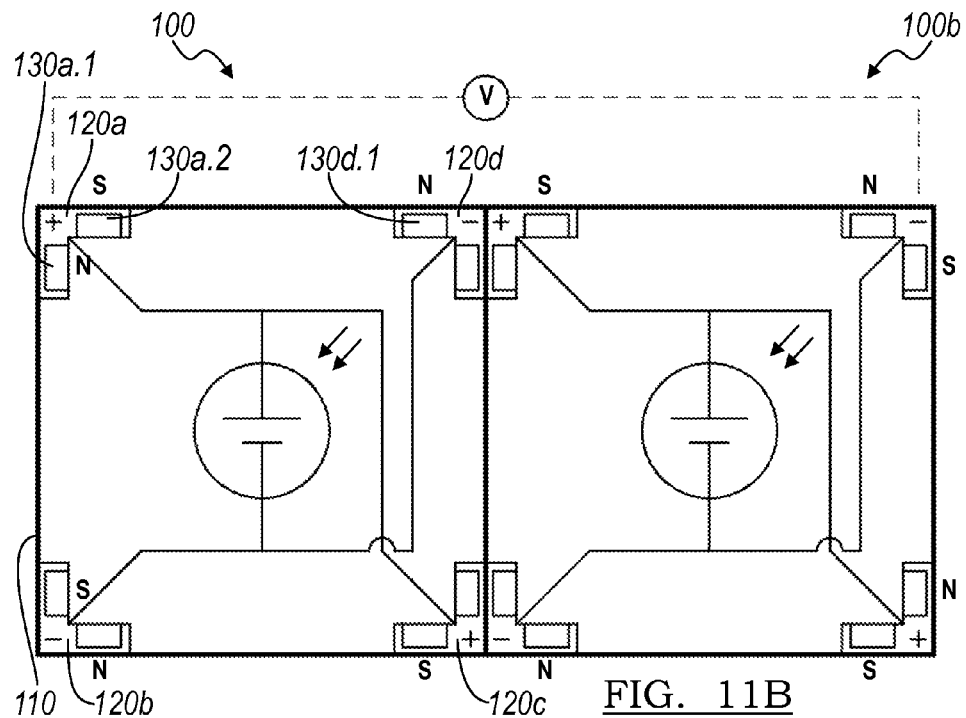
FIG. 11B is a schematic of two adjacent electronic modules, of the preferred embodiments, arranged with the circuits thereof connected in series.
Figure 13:
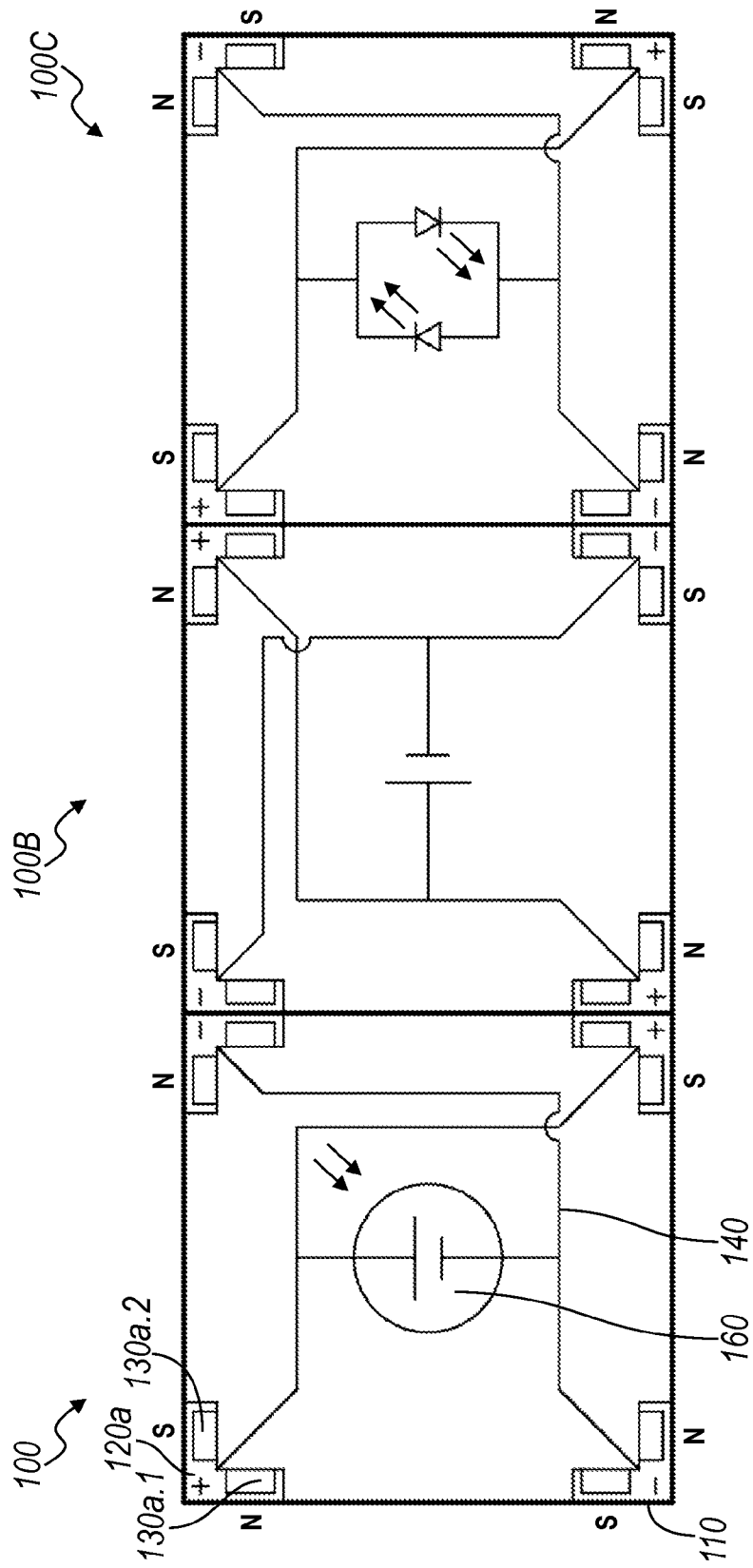
FIG. 13 is a schematic including various types of power modules to power an electronic module of the preferred embodiment.

As shown in FIGS. 11A and 11B, multiple power modules may be coupled in various configurations to supply power at various voltages and currents. In FIG. 11A, a first power module 100 and a second power module 100b are coupled in parallel; in this configuration, the pair of power modules 100, 100b may supply power at the same voltage as a single power module 100, but with the capability of sourcing twice the available energy and in some cases more current (depending on the loading conditions) as the single power module 100. In FIG. 11B, the first power module 100 and the second power module 100b are coupled in series; in this configuration, the pair of power modules 100, 100b may source the same current as a single power module 100, but at twice the voltage of the single power module 100. As shown in FIG. 13, multiple power modules of various types may be coupled, such as a photovoltaic power module and a battery module. However, any other number of power modules may be arranged in any other way to source any other amount of current at any other voltage.

6. Example Electronic Modules—Wireless Communication Module:

One variation of the electronic module 100 is a wireless communication module that functions to provide a communication link between any number of electronic modules and a peripheral electronic device. The wireless communication module may implement any form of wireless communication, such as Wi-Fi, 3G or 4G cellular, Bluetooth, Zigbee, XBee, or GPS communications; the wireless communication module preferably incorporates any circuitry or component necessary to enable any of these communications.

The wireless communication module preferably receives data from any other electronic module 100, such as a control module 200, and converts the data into appropriate form prior to transmitting the data to the external device. Furthermore, after receiving data from the external device, the wireless communication module preferably converts the data into a proper form for transmission to a second electronic module 100b via toes thereof. The wireless communication module therefore also preferably includes memory, of a suitable size, to store received data prior to transmission to a second electronic module 100b. The wireless communication module may thus permit wireless communication between a second electronic module 100b and any of: a desktop, laptop, or tablet computer; a smartphone; a cellular phone; a PDA; a digital watch; a personal music (MP3) player; headphones; a microphone; a credit card reader; a printer; industrial manufacturing equipment (e.g., a CNC milling machine); a multi-track digital audio recorder; automotive diagnostic equipment; an external hard drive or data storage device; a modem or router; a thermostat; an alarm system; or any other suitable external device. Any of the components of the wireless communication module may also be implemented in any other electronic module 100 to enable wireless communication of data between any number of electronic modules 100, 100b, either directly between two electronic modules 100, 100b or via the peripheral electronic device. However, the wireless communication module may function in any other way and communicate with any other external device and/or other electronic module 100.

7. Example Electronic Modules—Sensor Module:

One variation of the electronic module 100 is a sensor module that functions to sense a particular event and to transmit an output, based upon the occurrence of the event, to at least one other electronic module. Data transmission may be through at least one toe of the sensor module, via separate 'non-toe' data pins on the module, or wireless, such as optical or Bluetooth communication. The sensor may be any of: a light sensor; a temperature sensor; a noise sensor; a gas (e.g., carbon monoxide, smoke) sensor; a proximity sensor; a position sensor; a hall effect sensor; an ammeter; a barometer; a strain gauge; an air flow meter; a motion sensor; an RFID sensor; a barcode scanner; an accelerometer; a pressure sensor; a rotary or linear encoder; a camera; a touch sensor; a single- or multi-pole switch; a slider; a rotary switch; or any other suitable type of sensor. The sensor may, therefore, sense a user input and/or an environmental conditional proximal the housing 110 of the sensor module. The sensor may be configured to generate binary output (e.g., either a 'YES,' bit 'HI', 5V, or '1' output, or a 'NO,' bit 'LO', 0V, or 0 output) or a non-binary output (e.g., an analog or digitally-represented analog output). In one variation, the sensor sets a pin or bit 'HI' if an event has occurred and clears the pin or bit 'LO' if the event has not or is currently not occurring (or vice versa). In another variation, the sensor measures the magnitude of an input and generates an analog output voltage corresponding thereto; the analog output voltage is then passed through an A/D converter (e.g., a 4-, 8-, or 16-bit A/D converter), wherein the analog voltage is converted to a digital value and stored on a shift register 148 comprising a corresponding number of bits; the data on the shift register 148 may then be transmitted, via a toe, to a second electronic module 100b, such as a control module 200. However, an analog, non-power signal may also be combined with a power signal to communicate and analog value across two electronic modules; for example, for a substantially consistent or tightly-regulated power voltage (e.g., 3.3V), an analog signal may be read as any voltage greater than the power voltage. However, an input into the sensor module may be captured, stored, and/or transmitted in any other suitable way.

The sensor module may include any number of sensors of any type or combination of types. In the variation of the sensor module that includes a plurality of sensors, the output of each sensor may be transmitted, such as to a control module 200, following any substantially state change of a sensor; a state change of a sensor may prompt the sensor or other component within the sensor module to transmit a host notify protocol to a control module 200 to indicate to the control module 200 to prepare to receive a new sensor output. Alternatively, the outputs of the plurality of sensors may be stored on a shift register 148 or other memory of the sensor module, wherein the data stored in the shift register 148 is transmitted to a control module 200 when requested thereby, when the data suggests a threshold has been surpassed, or following any other trigger. However, the sensor module may function in any other way.

8. Example Electronic Modules—Solderless Plugboard (Breadboard) Module:

One variation of the electronic module 100 is a solderless plugboard (breadboard) module that functions as a construction base for prototype electrical/electronic circuits. At least one face 111 of the housing 110 of the plugboard module preferably includes a breadboard that is a perforated, non-conductive surface backed by a series of conductive spring clips (e.g., tie points or contact points), wherein the arrangement of and connections between the spring clips permit a user to removably install ICs, passive electronic components, wires, jumpers, displays, or other discreet components to assemble a (passive or active) circuit. A portion of the clips is preferably coupled to toes 120 of the housing 110 so as to provide power to the breadboard and thus any components installed therein. A portion of the clips is also preferably tied to a shift register 148, transistor(s), buck-boost circuit, or other component to capture and/or transmit, via a toe 120, an output of a prototype circuit assembled on the breadboard. The plugboard module may also be configured to transmit a data signal, received via toes 120 of the housing 110, to a portion of the clips to control a function of a circuit assembled on the breadboard. The plugboard module is therefore preferably configured to interface with a control module 200, wherein the plugboard functions as a reconfigurable input or output interface for any prototype circuit assembled thereon by a user.

9. Example Electronic Modules—Data Storage Module:

One variation of the electronic module 100 is a data storage module that functions to store data, sensor outputs, and/or code associated with a function of another electronic module 100b. The electronic module 100 preferably includes a memory module non-transiently (e.g., permanently) arranged within the housing 110, such as a solid-state memory drive or a hard disk drive (HDD). Alternatively, the data storage module may include one or more ports configured to accept a removable data storage device, such as a USB flash drive, a secure digital (SD) card, a mini SD card, a micro SD card, or any other suitable non-volatile data storage device. The data storage module may also include a back-up power source (e.g., a backup battery) that functions to provide power to the memory module in the event that a power module is prematurely decoupled from the data storage module. However, the data storage module may include any other component(s) and function in any other way.

10. Example Electronic Modules—Peripheral Electronic Device Interface Module:

As shown in FIG. 8, one variation of the electronic module 100 is a peripheral electronics device module that functions to communicate a power and/or data signal with an external electronic device, such as: a desktop, laptop, or tablet computer; a smartphone; a cellular phone; a PDA; a digital watch; a personal music (MP3) player; headphones; a microphone; a credit card reader; a printer; industrial manufacturing equipment (e.g., a CNC milling machine); a multi-track digital audio recorder; automotive diagnostic equipment; or any other suitable external device. The interface module preferably couples to the external device via a physical connection, such as via a plug for a physical data port of the external device. At least one face of the housing 110 may also define a support for the external device. In this example, the smartphone may be charged when the interface module is coupled to a power module, and data may be communicated between the smartphone and any other electronic module coupled to the interface module, such as audio data sent from a smartphone to a speaker module (shown in FIG. 8) or temperature data sent from a temperature sensor module to the smartphone. In one variation of the external device that includes a processor, the interface module may cooperate with the external device to complete the functions of the control module described above; in this variation, an application ('app') may also execute on the external device, wherein the app defines a graphical interface by which the user may control one or more functions of a plurality of electronic modules coupled thereto. Similarly, a user may employ the interface module and the external device to program reprogram the processor 150 of the control module 200, such as via a 'CodeWarrior' app. This variation may have the benefit of making coding and circuit prototyping substantially easier and/or more accessible for a user. In another variation of the external device that includes memory or data storage capabilities, the interface module may cooperate with the external device to function as the data storage module described above. In a further variation of the external device that includes one or more sensors (e.g., an accelerometer, gyroscope, camera, or button, as in an iPhone), the interface module may cooperate with the external device to function as the sensor module described above. However, the interface module may perform any other function in any other way.

11. Example Electronic Modules—Electromechanical Actuator Module:

One variation of the electronic module 100 is an electromechanical actuator module that functions to interact with the physical world via generation of a physical force. The electromechanical actuator module may include any of: a motor; a linear actuator; a solenoid; a solenoid valve; a pump; a fan; a speaker; or any other suitable electromechanical actuator. In the variation of the electromechanical actuator module that includes a motor, a wheel or plurality of wheels may be coupled to the motor, thus permitting a user to add one or more electromechanical actuator modules to a group of other electronic modules to provide mobility to the group of electronic modules. In the variation of the electromechanical actuator module that includes a solenoid valve, a user may couple the solenoid valve module to a pressurized fluid line and add, to the electromechanical actuator module, a power module, a control module 200, a line pressure sensor module, and an optical sensor module to construct a system for detecting proper orientation of a bottle in a bottling line and opening and closing a hot water jet to clean each bottle. However, the electromechanical actuator module may be coupled to any other type and/or number of electronic modules to provide any other functionality or achieve any other type of system (e.g., the telepresence robot described above). The electromechanical actuator module may therefore increase the functionality of a series of electronic modules by providing a means by which electronic modules may interact with the physical world.

12. Example Electronic Modules—Human Interface Module:

One variation of the electronic module 100 is a human interface module that functions to provide information to a user and/or receive inputs from a user. The human interface module preferably includes a digital display. In one variation, the human interface module includes a multi-color display, such as a color active-matrix LCD display; in a second variation, the human interface module includes a monochrome passive-matrix LCD display; in a third variation, the human interface module includes a series of LEDs, such as the electronic module 100 shown in FIG. 5a and 5B. The display may be configured to present relevant system information to the user, such as: power consumption; power level; power availability; clock speed of the processor 150; the state of any sensor or data captured by any sensor; the speed, position, or state of any electromechanical actuator; available data storage; previously-stored system data; errors; malfunctions of any electronic modules; video content downloaded from the internet via a communication module; a webpage downloaded by a communication module; instructions for the electronic module set 300; or any other relevant information. However, the human interface module may include any other type of display to present any other relevant information to a user.

Like the sensor module described above, the human interface module may also include any number of user input mechanisms, such as knobs, switches, buttons, sliders, cameras, etc., to capture a user input. A user input, via any such component, may be handled in any suitable way, such as described above.

13. Module Combinations:

Finally, a electronic module 100 may include any combination of any of the aforementioned components of any of the aforementioned variations to achieve the same or additional functionalities. For example, the electromechanical actuator module that includes a motor may further include a sensor that is an encoder, wherein the encoder is coupled to the motor to determine the angular position of the motor. In another example, the control module 200 may further include a digital display, buttons, and switches to provide real-time information to the user and to permit the user to provide on-the-fly inputs to change a function or operation of the processor 150. However, a electronic module 100 may operate in any other way and include any other component(s) to achieve any other desired functionality.

As a person skilled in the art will recognize from the previous detailed description and from the FIGURES and Claims, modifications and changes can be made to the preferred embodiments of the invention without departing from the scope of this invention defined in the following Claims.

We claim:

1. An electronic module comprising:
   a housing comprising a plurality of external faces, a first electrically-conductive toe, a second electrically-conductive toe, and a third electrically-conductive toe, each toe extending from a external face to an adjacent external face of the housing;
   a first magnetic element arranged within the housing and proximal the first toe;
   a second magnetic element arranged within the housing and proximal the second toe;
   a third magnetic element arranged within the housing and proximal the third toe;
   a circuit arranged within the housing, electrically coupled to the first toe, to the second toe, and to the third toe, the circuit operable between a first mode and second mode, the circuit operable in the first mode when the first toe is in contact with a first terminal of a second electronic module and the second toe is in contact with a second terminal of the second electronic module, the circuit operable in the second mode when the second toe is in contact with the second terminal of the second electronic module and the third toe is in contact with a third terminal of the second electronic module the circuit communicating a first voltage potential across the first toe and the second toe in the first mode and communicating a second voltage potential across the second toe and the third toe in the second mode, the second voltage potential different from the first voltage potential;
   the magnetic elements configured to transiently retain a second electronic module against the housing in both stacked and adjacent configurations;
   the first toe configured to communicate a portion of a power signal between the circuit and the second electronic module in either of the stacked and adjacent configurations; and
   the magnetic elements configured to repel contact between at least one toe and at least one terminal of the second electronic module in an upside-down configuration.

2. The electronic module of claim 1, wherein the magnetic elements are further configured to transiently retain the second electronic module against the housing in an out-of-plane configuration, and wherein the first toe is further configured to communicate a power signal between the circuit and the second electronic module in the out-of-plane configuration.

3. The electronic module of claim 1, wherein the first toe is further configured to substantially simultaneously communicate a DC power signal and a digital signal between the circuit and the second electronic module.

4. The electronic module of claim 1, wherein the first toe extends to a third adjacent face and defines a corner of the housing.

5. The electronic module of claim 1, wherein one face of the housing defines a removable cover configured to provide access to a portion of the circuit.

6. The electronic module of claim 1, wherein the faces of the housing comprise substantially electrically non-conductive material.

7. The electronic module of claim 1, wherein the first toe and the first magnetic element are physically coextensive.

8. The electronic module of claim 1, wherein the housing is configured to contain a power source comprising a photovoltaic cell.

9. The electronic module of claim 1, wherein the housing is configured to contain a power source comprising a battery including a first and second terminal, wherein the first terminal of the battery is coupled to the first toe and the second terminal of the battery is coupled to the second toe.

10. The electronic module of claim 9, wherein the first and second magnetic elements and the first and second toes cooperate to charge the battery in the presence of an alternating electromagnetic field proximal the housing.

11. The electronic module of claim 1, wherein the circuit comprises a first portion including a first LED configured to light in a first color in the first mode, and wherein the circuit comprises a second portion including a second LED configured to light in a second color in the second mode.

12. The electronic module of claim 1, further comprising a data port coupled to the circuit and accessible through a face.

* * * * *